United States Patent [19]

Hart

[11] Patent Number: 5,285,528
[45] Date of Patent: Feb. 8, 1994

[54] DATA STRUCTURES AND ALGORITHMS FOR MANAGING LOCK STATES OF ADDRESSABLE ELEMENT RANGES

[75] Inventor: Caswall A. Hart, Millwood, N.Y.

[73] Assignee: International Business Machines Corporation, Armonk, N.Y.

[21] Appl. No.: 660,451

[22] Filed: Feb. 22, 1991

[51] Int. Cl.⁵ .................................... G06F 12/00
[52] U.S. Cl. ......................... 395/725; 364/246.8; 364/281.5; 364/DIG. 1; 364/969.2; 364/DIG. 2
[58] Field of Search ............. 395/725, 650, 425, 325; 364/246.8, 281.5, DIG. 1, 969.2, DIG. 2

[56] References Cited

U.S. PATENT DOCUMENTS

| | | | |
|---|---|---|---|
| 4,087,752 | 5/1978 | Melvin | 325/30 |
| 4,480,304 | 10/1984 | Carr et al. | 395/725 |
| 4,574,350 | 3/1986 | Starr | 395/725 |
| 4,709,326 | 11/1987 | Robinson | 395/725 |
| 4,716,528 | 12/1987 | Crus et al. | 395/650 |
| 4,763,244 | 8/1988 | Moyer et al. | 364/200 |
| 4,766,537 | 8/1988 | Zolnowsky | 364/200 |
| 4,800,489 | 1/1989 | Moyer et al. | 364/200 |
| 4,823,310 | 4/1989 | Grand | 364/900 |
| 5,060,144 | 10/1991 | Sipple et al. | 395/650 |
| 5,089,952 | 2/1992 | Bozman | 395/725 |
| 5,140,685 | 8/1992 | Sipple et al. | 395/425 |
| 5,161,227 | 11/1992 | Dias et al. | 395/725 |
| 5,175,852 | 12/1992 | Johnson et al. | 395/600 |

OTHER PUBLICATIONS

"Operating Systems"; Lorin et al.; Addison-Wesley; 1981; Chapter 12.
"The UNIX Programming Environment"; Keringham et al.; Prentice Hall, Inc.; 1984.
"An Introduction to Operating Systems"; Dietel; Addison-Wesley; 1984; Chapter 21.
"An Introduction to Database Systems"; Date; vol. 1; 3rd Edition; Addison-Wesley; 1981.
"Data Structures and Program Design"; Kruse; 2nd edition; Prentice-Hall; 1984; p. 344.
"Locking Protocols for Concurrent Operations on B—Trees"; Bayer et al; IBM Technical Disclosure Bulletin; vol. 19; No. 10; Mar. 1977.

*Primary Examiner*—Michael R. Fleming
*Assistant Examiner*—Glenn A. Auve
*Attorney, Agent, or Firm*—Whitman & Marhoefer

[57] ABSTRACT

An efficient algorithm for addressable element range locking in shared resources, such as files and memory, of a multi-tasking or multi-processor data processing system provides a very fast mechanism that can properly handle overlapping requests to lock ranges of data of the data processing system while locking or granting wait status to a requestor for any more of the shared resource than is actually requested. This is accomplished by providing singular descriptions of locked and requested ranges of addressable elements. As further requests are received or locks released on overlapping ranges of addressable elements, these singular descriptions are divided or recombined into other singular descriptions of non-overlapping ranges. Problems of overlapping requests are thus handled by dynamically decomposing requests into non-overlapping segments which are then granted atomically. Fast searching for potential deadlocks is accomplished by placing control information about locked areas into a binary tree structure.

26 Claims, 19 Drawing Sheets

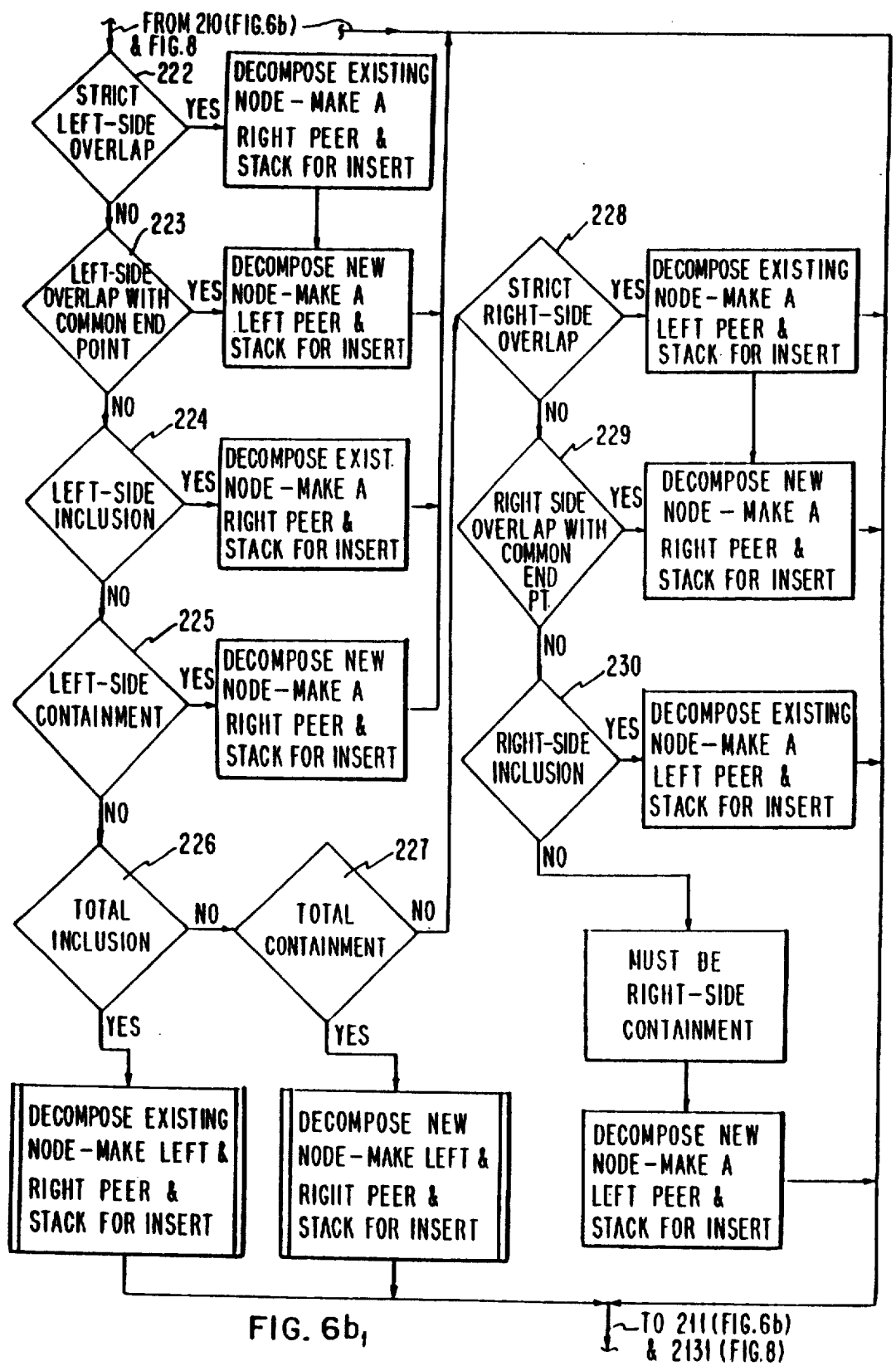
FIG. 6b₁

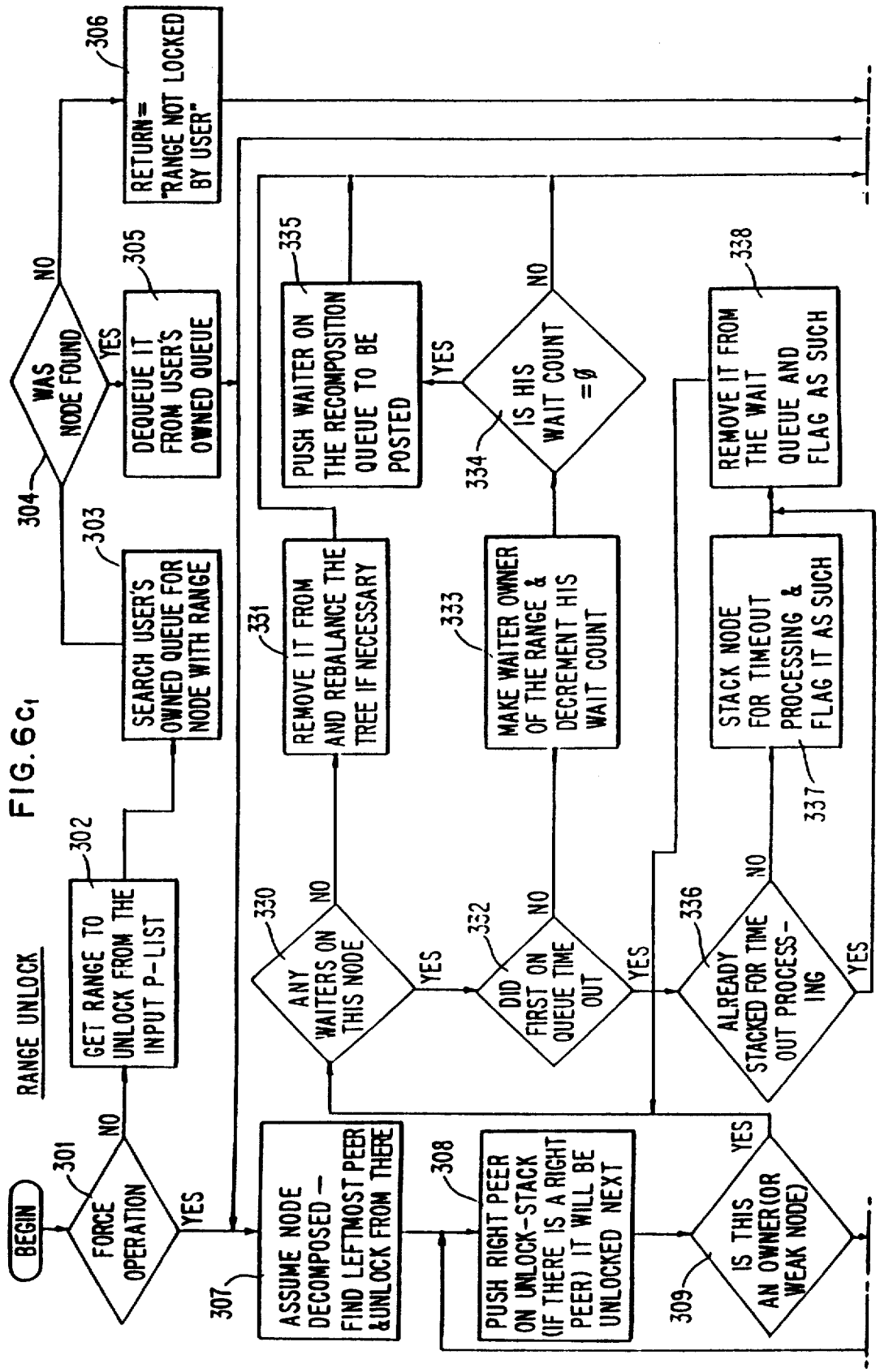

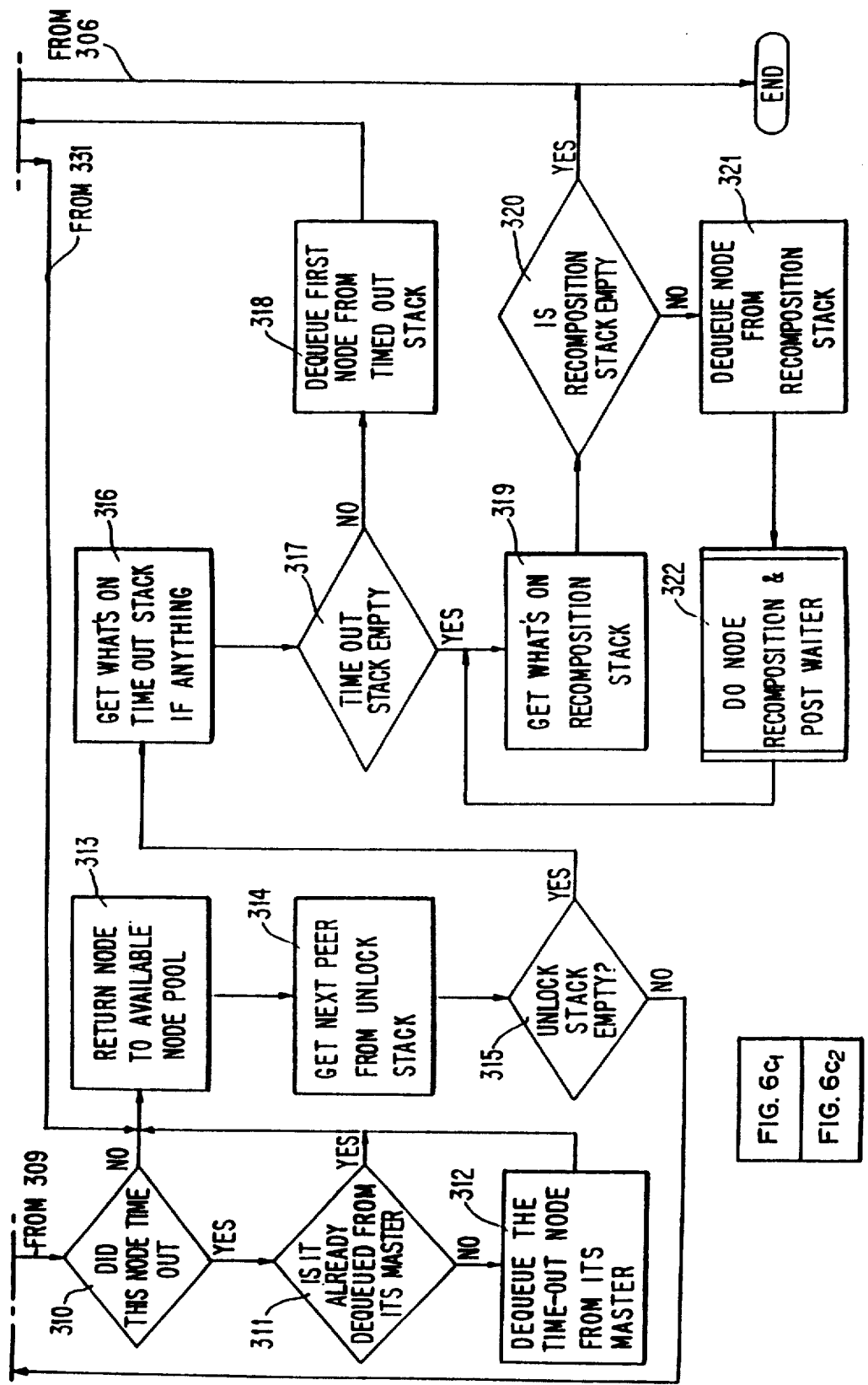

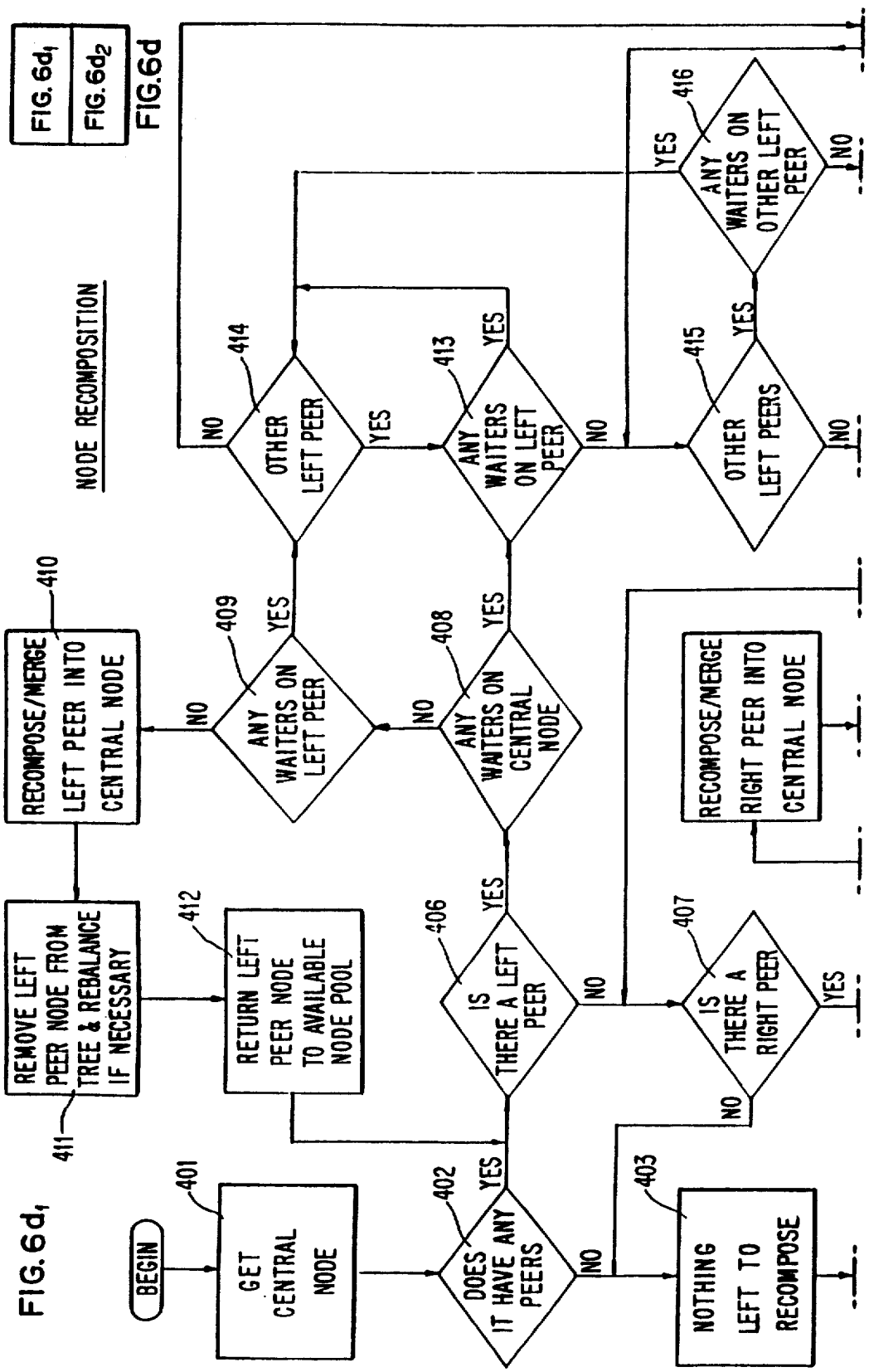

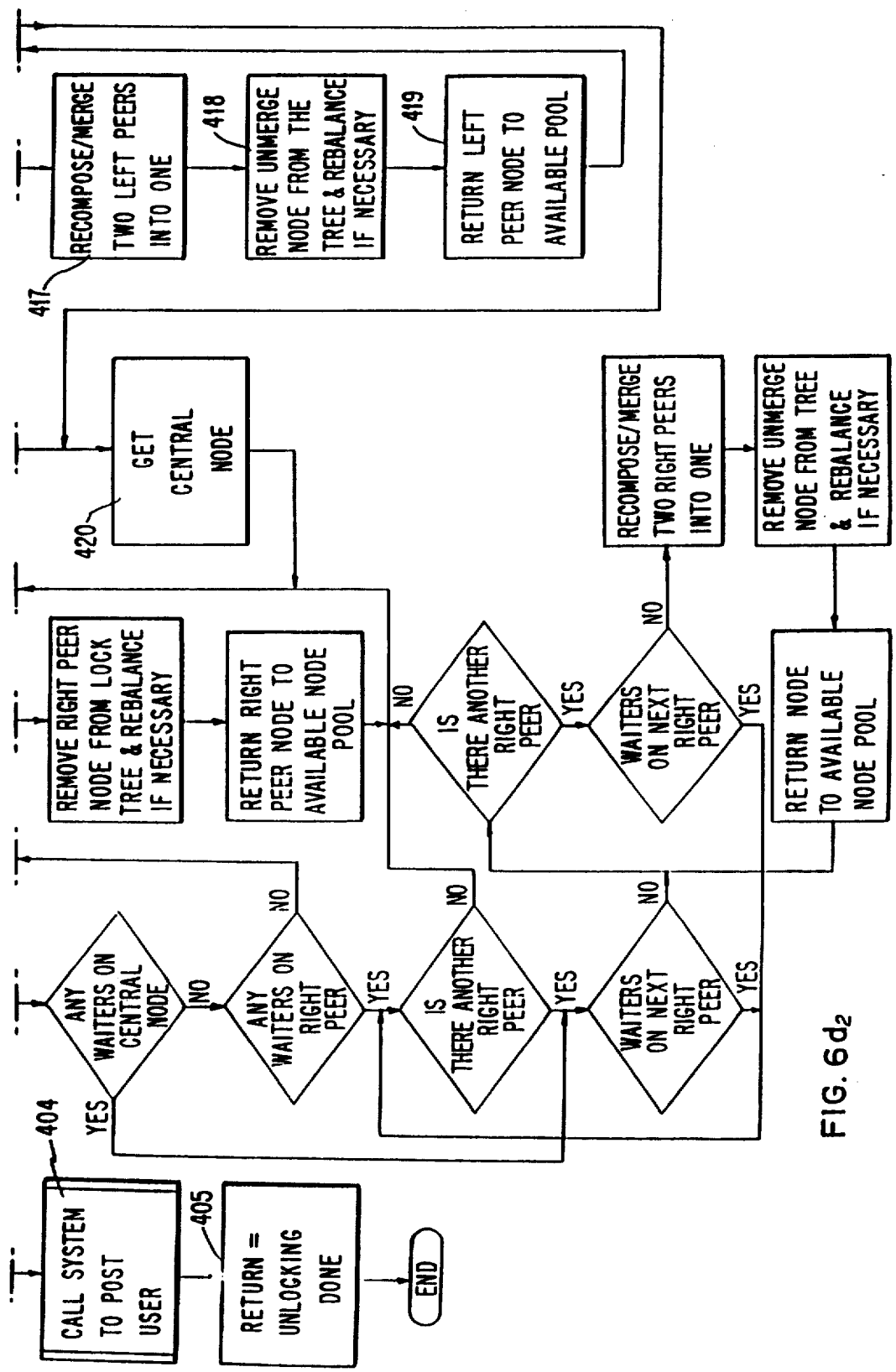
FIG. 6d₂

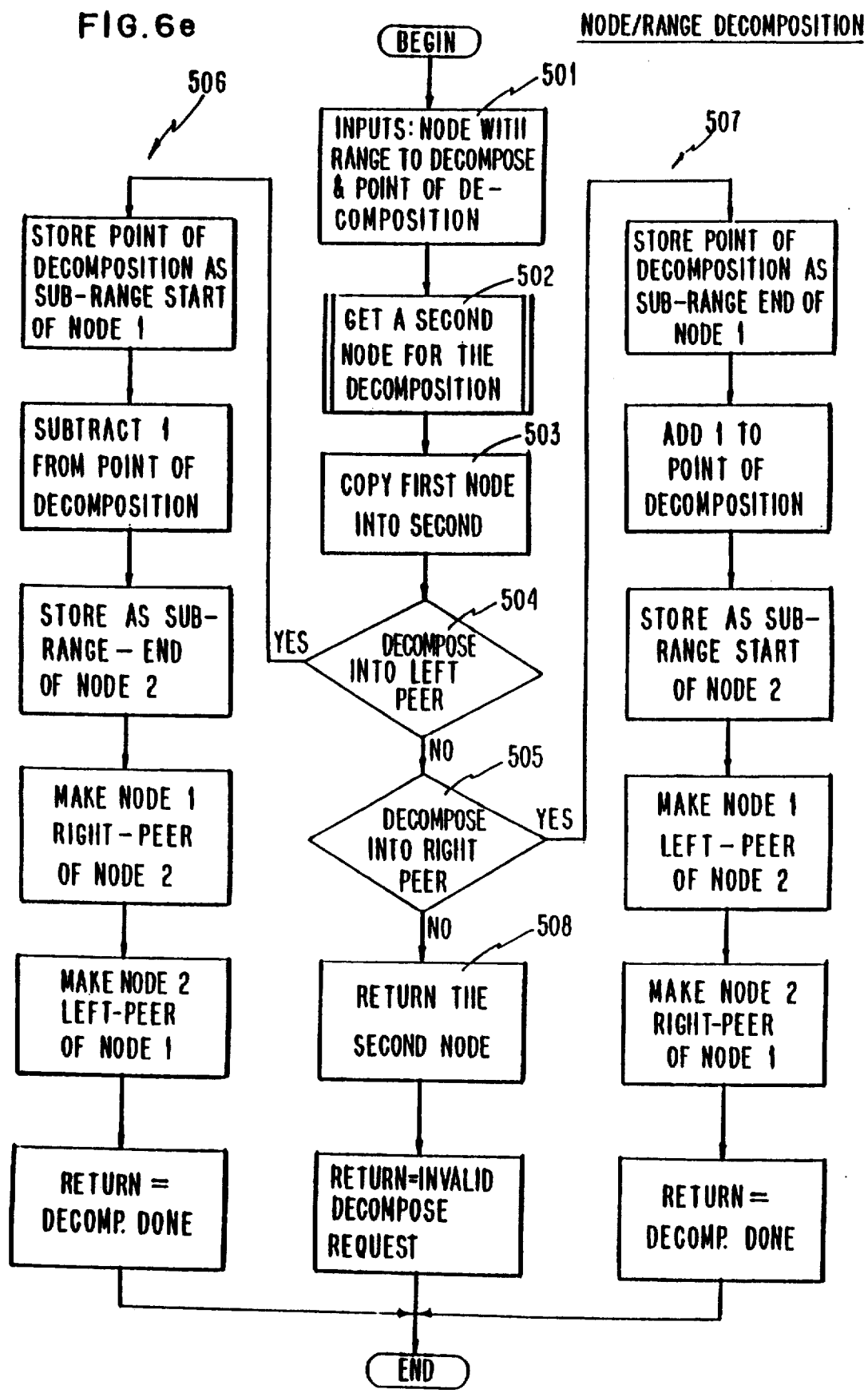

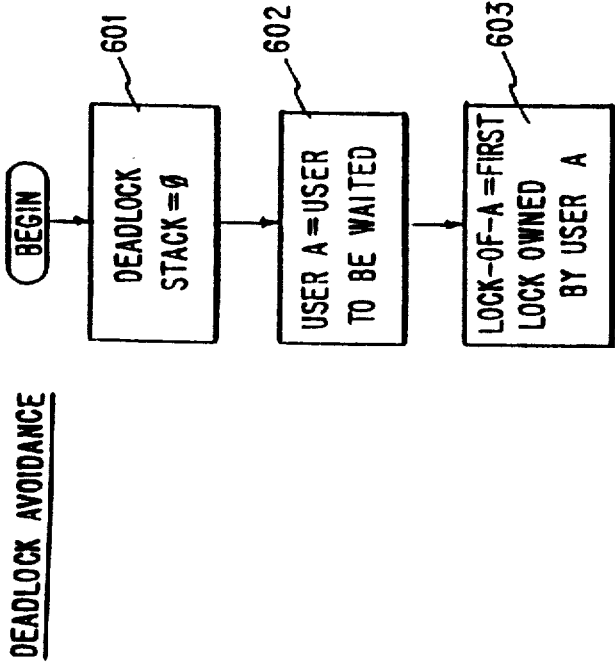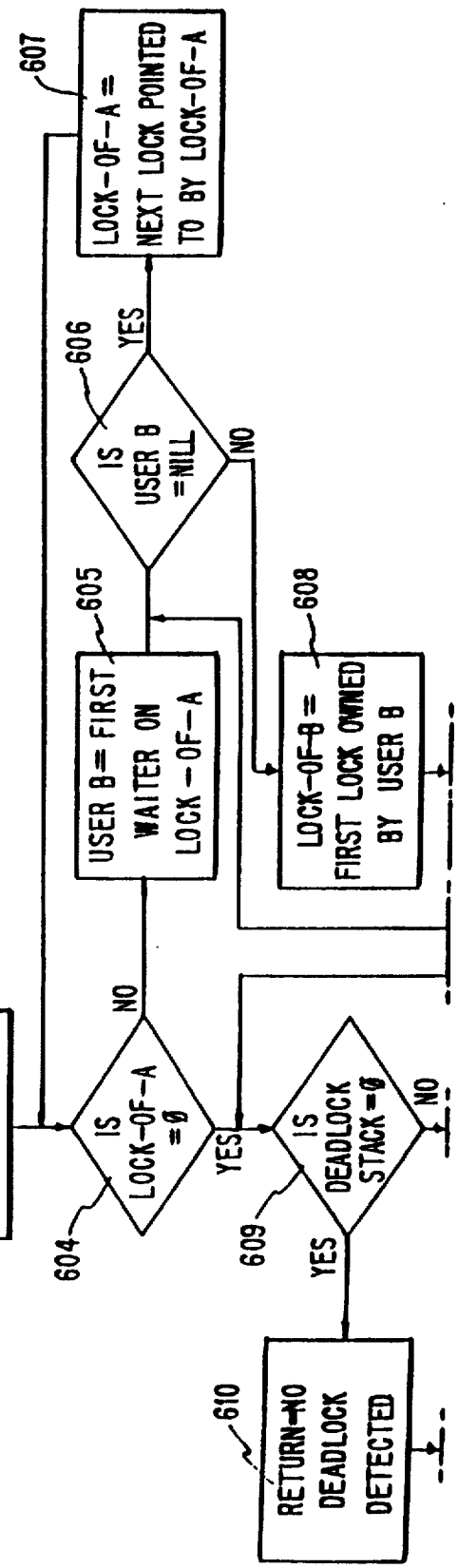

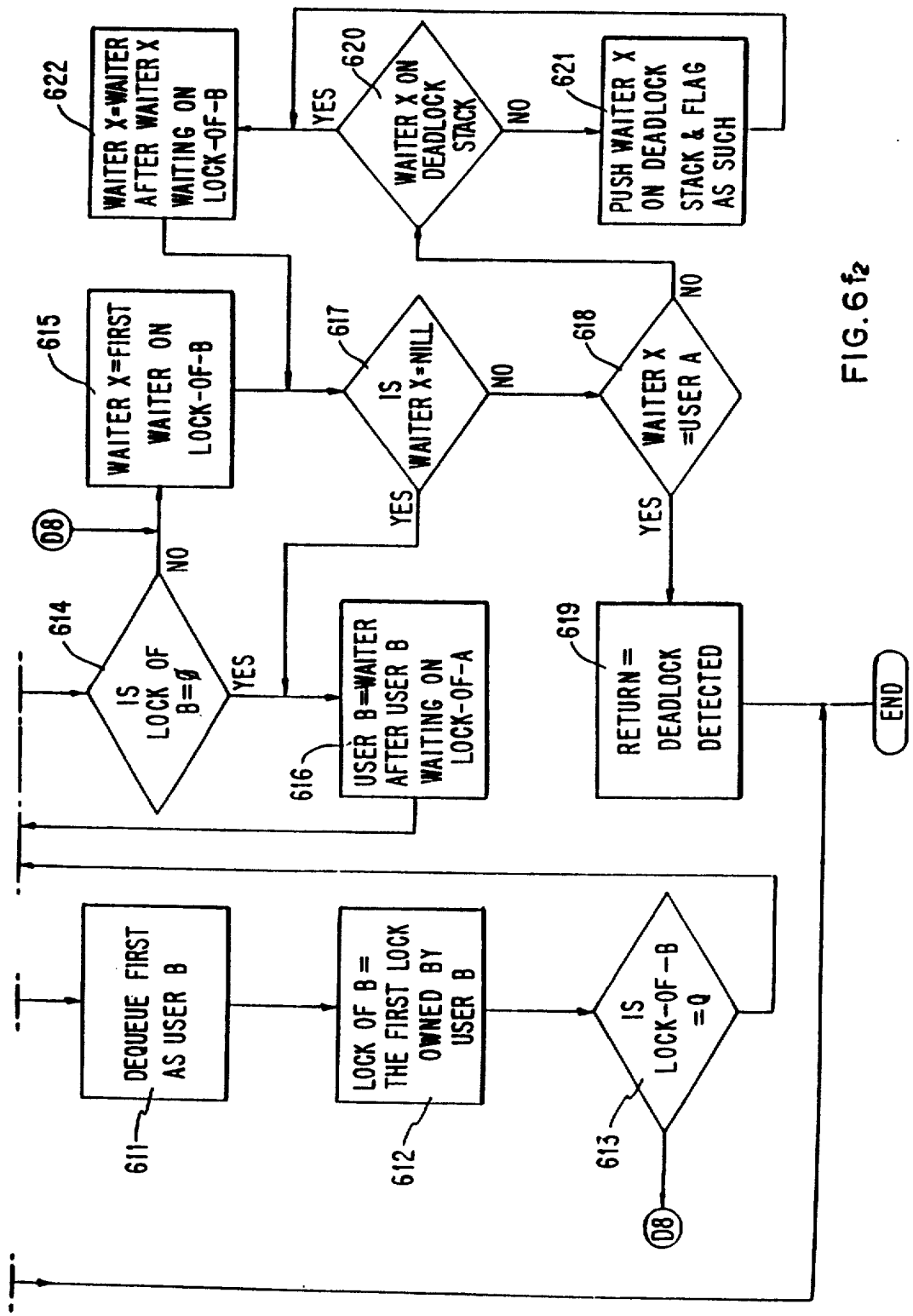
FIG. 6 f₂

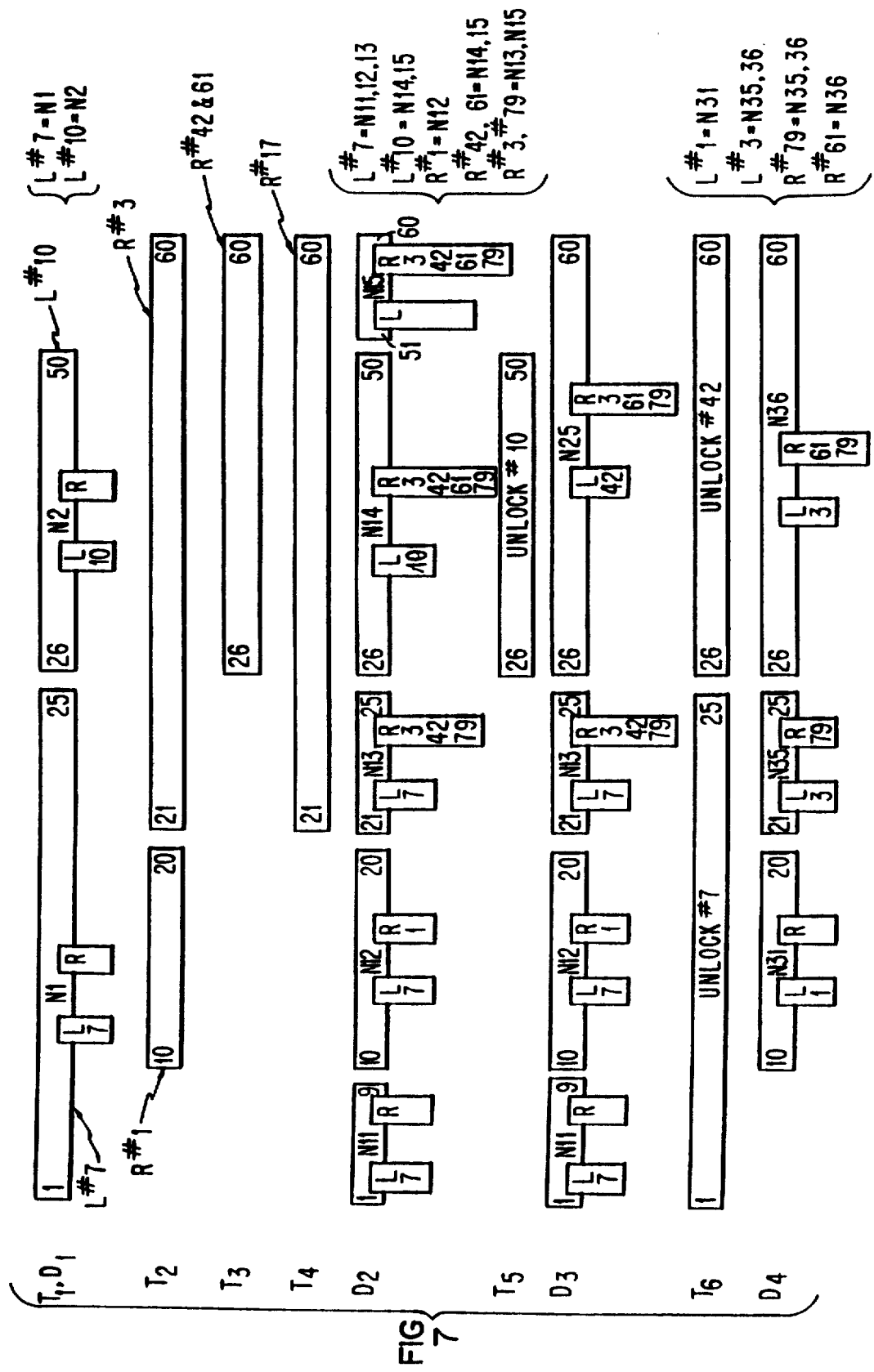

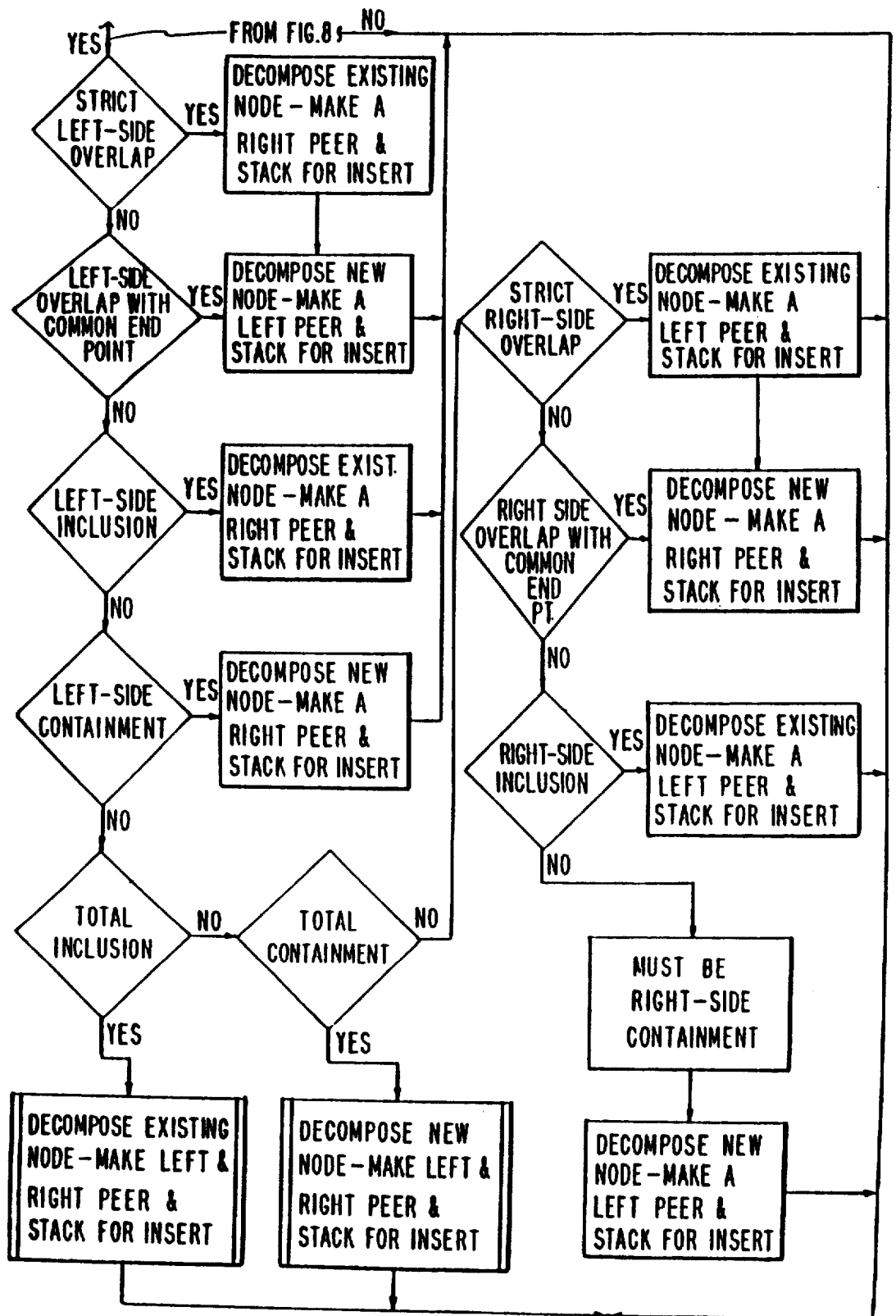
FIG. 8₁

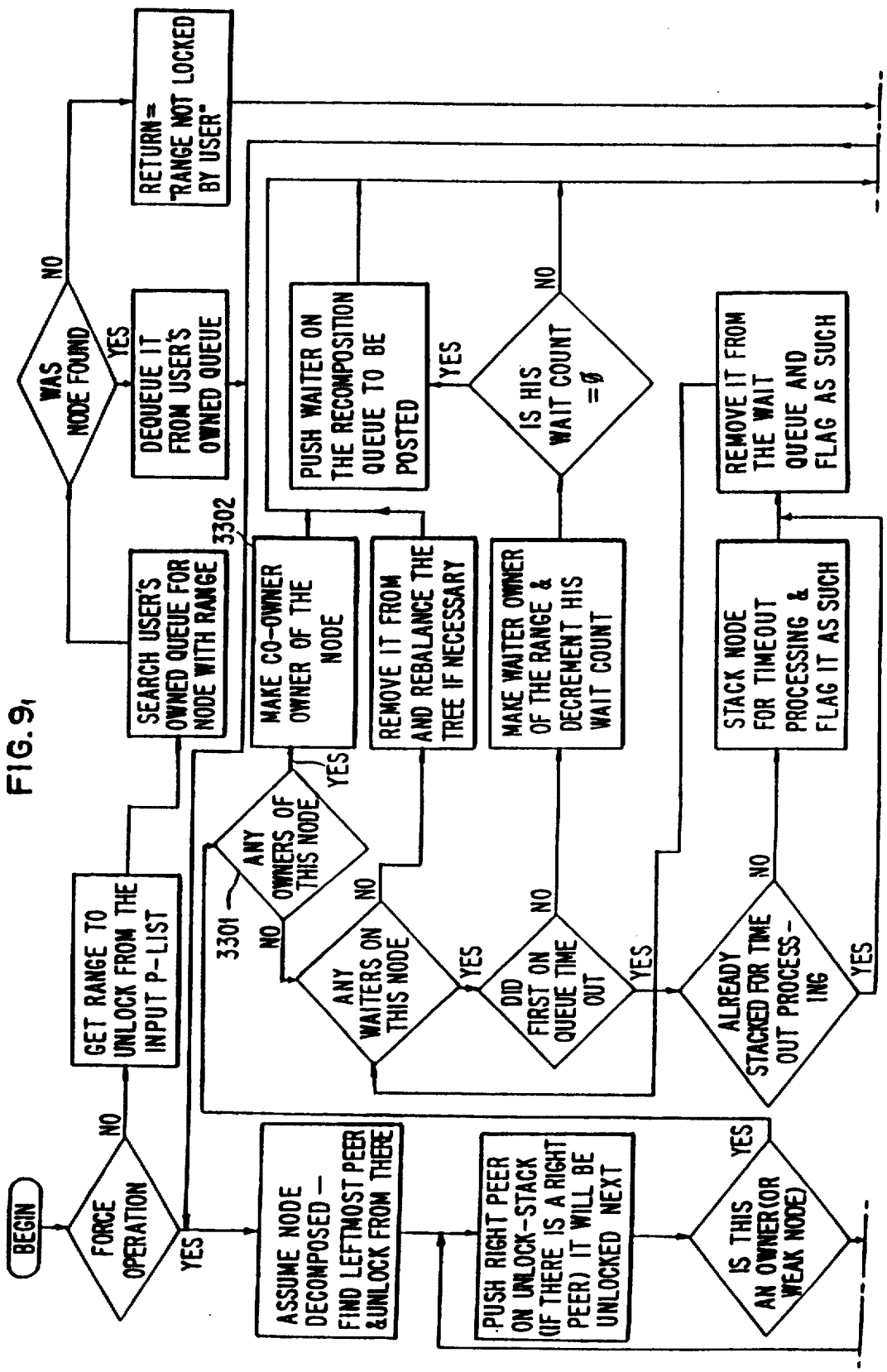

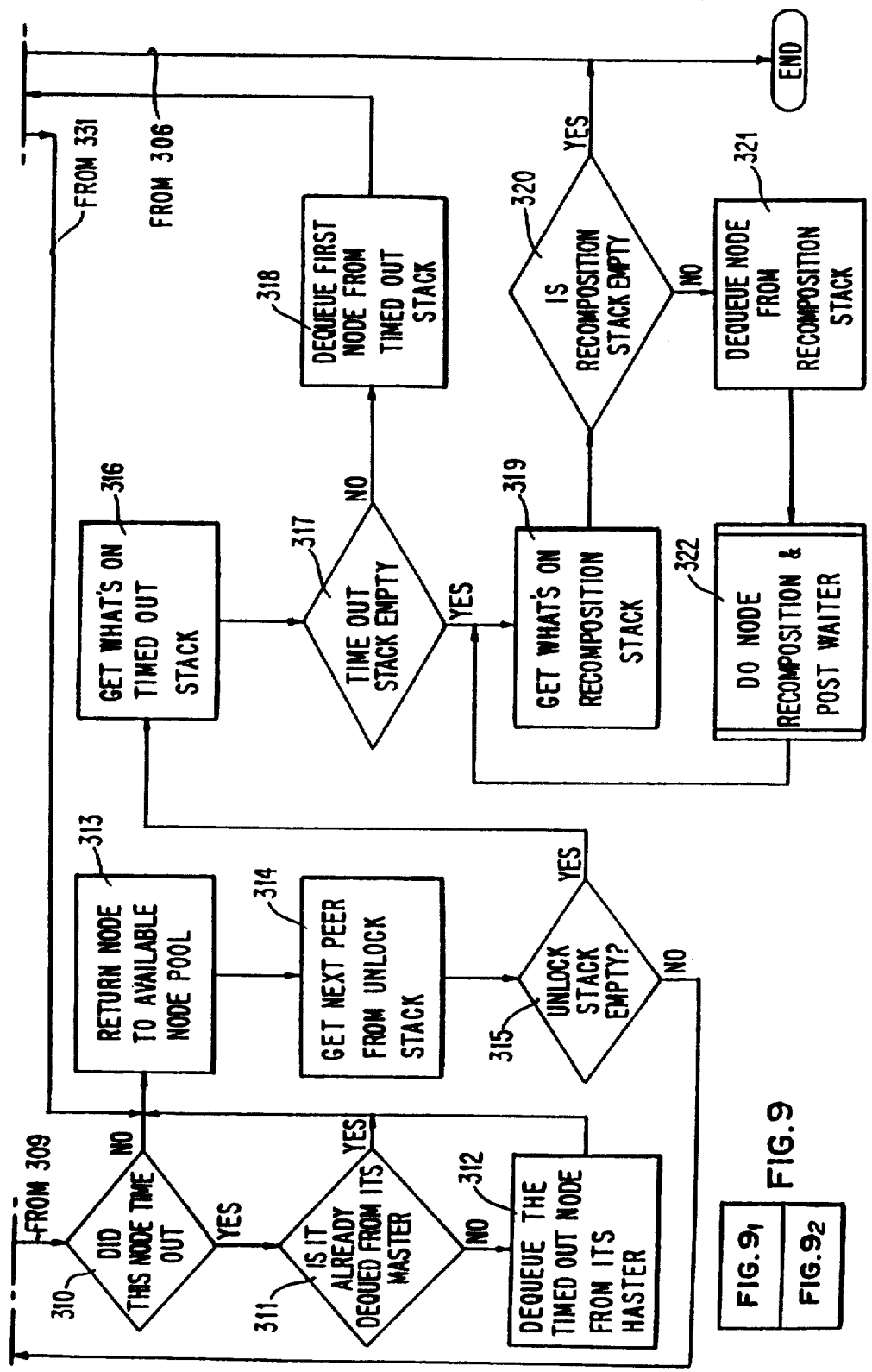

FULL NODE DEFINITION

| | | |
|---|---|---|
| 0 | OWNER_TASK_ID | |
| 8 | | |
| 16 | LOCK_ELEMENT_PTR | NEXT_LOCKED_RANGE |
| 24 | NEXT_TIMED_OUT_NODE | NEXT_NODE_TO_RECOMPOS |
| 32 | WAIT_QUEUE_ANCHOR | NEXT_WAITER_ON_QUEUE |
| 40 | WAIT_PEERS_COUNT | MASTER_NODE_POINTER |
| 56 | CENRAL_NODE_POINTER | FILE_OFFSET |
| 64 | RANGE_LENGTH | PARENT_NODE |
| 72 | LEFT_PEER | RIGHT_PEER |
| 80 | LEFT_CHILD | RIGHT_CHILD |
| 88 | SUBRANGE_START | SUBRANGE_END |
| 96 | reserved | BF | flags |

FIG. 10

DATA STRUCTURES AND ALGORITHMS FOR MANAGING LOCK STATES OF ADDRESSABLE ELEMENT RANGES

BACKGROUND OF THE INVENTION

1. Field of the Invention

The present invention generally relates to shared resource management in multi-tasking or multi-processor data processing systems and, more particularly, to a way to efficiently monitor and manage locked ranges of addressed elements, where the requested ranges of addressed elements can overlap, in a shared resource such as peripheral equipment or a byte space of a file or memory.

2. Description of the Prior Art

It is common in a multi-tasking or a multi-processor data processing system to asynchronously or concurrently share resources such as files, tables or memory. Many shared resources, however, can consist of a unitary entity or a multiplicity of entities known as addressable elements. A major characteristic of the utilization of these shared resources is the ability to randomly access and share a portion of the addressable elements within the resource. A portion of the addressable elements is commonly referred to as a range and is described by a starting point, called the offset (e.g. from the initial address of the resource), and the number of contiguous elements desired, called the length of the range. A special case would be a range of one addressable element which is described by an offset and a length of one. Possible types of shared resources would include processors in a parallel processing element or array, indices or records in a database, bytes in a file or in memory, entries in a Direct Access Storage Device (DASD) arrangement or hardware such as a range of input/output (I/0) devices such as displays and/or printers.

In this general type of environment, there may be several programs or processes running on one or more processors. These processes typically run concurrently but do not have any knowledge of other processes which may be running on the same data processing system. More than one of these processes may need to access a shared resource at the same time. This is known as resource contention. In order to resolve such contention, the processes rely on the system control program to monitor and coordinate access to the resource. Depending on the type of addressed elements which may exist in the shared resource and the type of access required, predetermined rules must be made to apply to addressed elements which are accessed or to which access is sought at a given time. For instance, if the shared resource is a database, access may be desired to be exclusive for read/write access or where different operating systems (e.g. DOS TM, UNIX TM, OS/2 TM) may be in use at the same time, or access may be desired to be shared, for example, for read only access. With respect to a database, such accesses are referred to as locks. However, for clarity, each different type of access and, correspondingly, each set of rules which are to be applied for each type of access will be referred to as a state or state information. Therefore, exclusive access and shared access would be two distinct states of a lock.

System control programs including operating systems such as UNIX TM (a trademark of AT&T Bell Labs.) and IBM Corp.'s MVS (for Multiple Virtual Storage) provide files that consist of strings of bytes. These files in turn may be shared by multiple processes. Typically, the processes read and change only parts of the file. In order to insure the integrity of the file contents, it is necessary to assure that no two processes change the same data at the same time. At a minimum, a facility that allows voluntary locking of ranges of data is needed that will provide for exclusive use of data. Requests to lock a range of bytes would specify the first and last bytes to be locked. If the request was in the form of offset (e.g.first byte) and length, then the last byte could be computed.

General information on operating systems and, in particular, may be had by reference to Chapter 12 of the text book by Harold Lorin and Harvey M. Deitel entitled *Operating Systems*, published by Addison-Wesley Publishing Co. (1981). Specific information about the UNIX TM operating system may be had by reference to the book by Brian W. Kernigham and Rob Pike entitled *The UNIX Programming Environment*, published by Prentice-Hall, Inc. (1984). Specific information about the MVS operating system may be had by reference to Chapter 21 of the text book by Harvey M. Dietel entitled *An Introduction to Operating Systems*, published by Addison-Wesley Publishing Co. (1984). UNIX TM systems are also described in Chapter 18 of the Dietel text book.

Lock requests have been processed by a number of differing techniques in the past. The most difficult problem that is posed by addressable element range locking is that overlapping range lock requests may occur. For example, one lock request might hold addressable elements 6 and 7 and another request might request addressable elements 1 to 1000.

Techniques for efficiently managing this type of problem exist, depending on the type of system with in which it is encountered and the types of accesses which may be required. Such known techniques include:

1. Bit Maps using flags covering the entire addressable element space to indicate the existence of locks together with a supplementary system to monitor and identify the owners of the locks and, if necessary, to resolve overlapping range lock requests (principally applicable to small shared resources where overlapping requests are not present or occur infrequently);

2. Linked Lists containing information indicating the locked ranges and the owners of the locks (principally applicable to systems which are not highly interactive or where requests are not highly randomized or of great number and having a small number (e.g. less than 10,000) of shared files, a small (e.g. less than 600) number of processes, and in which response time is not critical (since search for conflicts through linked lists is an inherently slow procedure));

3. Individual addressable element locking in which each addressable element is viewed as an entity and separate lock information maintained (principally applicable where anticipated lock ranges are small); and 4. Rounding up which is similar to individual element locking except that the resource is divided into predetermined ranges, each of which is treated as a separate entity and extends the concept of individual addressable element locking to larger lock ranges.

While these known approaches and techniques have been adequate for particular systems and applications, none is generalized or capable of efficient application to a variety of systems and applications. All exhibit inherent inefficiencies such as hardware inefficiency imposed by bit maps and individual element locking or inefficiency of shared resource utilization where the rounding up technique results in the locking of a greater portion of the shared resource than is requested.

SUMMARY OF THE INVENTION

It is therefore an object of the present invention to provide an efficient algorithm for addressable element range locking in files of a data processing system.

It is another object of the invention to provide a very fast mechanism that can properly detect and handle overlapping requests to lock ranges of a shared resource (e.g. data and application programs) in a data processing system.

It is a further object of the invention to provide management for lock requests (e.g. state information) which is of wide applicability and largely independent of the number or types of states which can be provided, the number of addressable elements in the shared resource and the ranges of addressable elements which may be included in lock requests.

It is another further object of the invention to provide a hardware-efficient lock management system which also allows efficient utilization of the shared resource by requiring locking of no more of the shared resource than is requested in any request.

To achieve the above and other objects and advantages of the present invention, a method of managing lock requests is provided in accordance with one aspect of the invention including the step of creating and maintaining at least one singular description of a range of said addressed elements, said addressable elements corresponding to each said singular description having a continuous sequence of addresses, wherein all of said lock states of said addressable elements are represented by one of said singular descriptions.

In accordance with another aspect of the invention, a method and apparatus for locking ranges of addressable elements in shared resources of a multi-tasking or multi-processor data processing system is provided so as to properly handle overlapping requests to lock ranges of data and files in the data processing system, including the step of or means for dynamically decomposing requests into non-overlapping segments and then granting the decomposed requests atomically.

In accordance with a further aspect of the invention, an apparatus including a lock manager means for representing possibly overlapping lock ranges of addressed elements is provided including means for creating and maintaining at least one singular description of at least one range of addressable elements representing one or more addressable elements, and means responsive to at least requests for locks for controlling the means for creating and maintaining at least one singular description to at least divide overlapping descriptions of ranges of said addressable elements into non-overlapping, singular descriptions of ranges of said addressable elements.

In accordance with yet another aspect of the invention, an apparatus including a lock manager means for maintaining a representation of at least one lock state range of addressable elements, said apparatus including means for maintaining said representation of said at least one lock state range as at least one singular description of at least one range of said addressable elements.

In accordance with another further aspect of the invention, an a method of managing lock states of overlapping ranges of addressable elements is provided including the step of creating and maintaining at least one singular description of a range of said addressed elements, said addressable elements corresponding to each said singular description having a continuous sequence of addresses, wherein all of said lock states of said addressable elements are represented by one of said singular descriptions.

In accordance with yet another further aspect of the invention, a method of managing lock requests for locks on addressable elements of a shared resource including the steps of granting a lock on a requested range of a shared resource, said lock having a range coextensive with a request for said lock by a user of said shared resource, creating and storing a singular description of at least a portion of said range of said lock, creating a description of said lock and a further request for a lock on a range of said shared resource by another user of said shared resource, including at least one of a) creating and storing a divided description of said lock; one portion of said divided description of said lock being a singular description of a range of said addressable elements coextensive with a portion of said further request on which a wait is granted, b) creating and storing a divided description of said further request; one portion of said divided description of said further request being a singular description of a range of said addressable elements coextensive with a portion of said lock on which a wait is granted, and c) creating and storing, within said singular description of said lock, a wait on a range coextensive with said further request.

In accordance with yet another further object of the invention, a lock manager means is provided including a data structure containing data identifying locks granted and requested for ranges of addressable elements within a shared resource wherein, when both locks and requests for locks are present, the data structure comprises only singular descriptions defining ranges of consecutive addresses of addressable elements which are at least one of fully held and fully requested.

In accordance with a still further aspect of the invention, a means for managing a multiplicity of addressable elements is provided, each of the addressable elements having at least two different possible ownership conditions, one of the ownership conditions being an owned condition identifying at least one owner corresponding to said owned condition, the means for managing a multiplicity of addressable elements comprising, means for dynamically partitioning the multiplicity of addressable elements into non-overlapping subranges of addressable elements, means for creating and maintaining a list of owners associated with each subrange of addressable elements, each owner in the owner list having an owned condition with respect to each addressable element in the subrange, means for creating and maintaining a list of waiters associated with each subrange of addressable elements, each waiter in the waiter list waiting for release of an owned condition with respect to each addressable element in at least one subrange, means for linking each owner in any owner list with the same owner in other owner lists, the linking forming a linked list corresponding to one request for an owned condition granted to the same owner, means for linking each waiter in any waiter list with the same waiter in other waiter lists, said linking forming a linked list corresponding to one request for an owned condition granted to the same waiter, means responsive to a further request by a requestor for an owned condition of at least one range of addressable elements, including addressable elements which are included within at least one subrange of addressable elements, for further dynamically partitioning at least one subrange of said multiplicity of addressable elements to separate addressable elements in the further request and included within the subrange of addressable elements from addressable elements in the subrange of addressable elements which are not included in the further request, if any, and including means for adding the requestor to one of the owner lists and waiter lists of at least one subrange resulting from the dynamic partitioning or the further dynamic partitioning of addressable elements.

BRIEF DESCRIPTION OF THE DRAWINGS

The foregoing and other objects, aspects and advantages will be better understood from the following detailed description of a preferred embodiment of the invention with reference to the drawings, in which:

FIG. 7 is a diagram illustrating the organization of information corresponding to and associated with a node of a data structure in accordance invention;

FIGS. 9, 9$_1$ and 9$_2$ are a block diagram showing alteration of the unlock processor of FIG. 6c to accommodate multiple lock states; and FIG. 10 is a diagram useful in understanding the operation of the invention and the data used to define each node.

DETAILED DESCRIPTION OF A PREFERRED EMBODIMENT OF THE INVENTION

Figure 1:
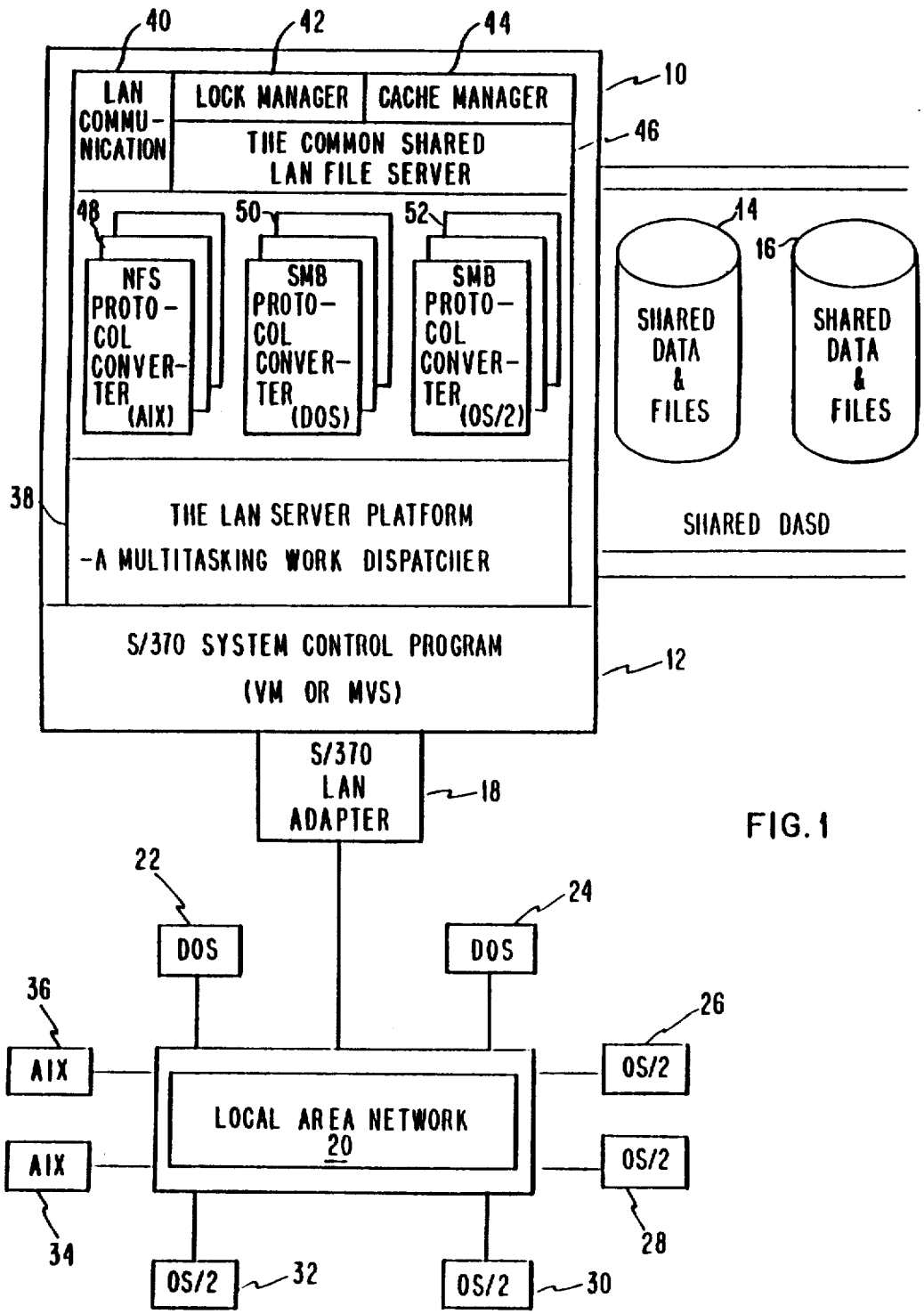
FIG. 1 is a block diagram showing an IBM S/370 LAN file server model on which the subject invention may be implemented.

Referring now to the drawings, and more particularly to FIG. 1, there is shown in block diagram form an IBM S/370 LAN (local area network) file server model. The system includes a mainframe computer 10 of the IBM System 370 family of computers on which is installed a S/370 control program 12, here indicated as either VM or MVS. Attached to the mainframe computer 10 are a plurality of DASDs (Direct Access Storage Devices) 14 and 16. These are typically disk drives on which are stored shared data and files which are managed by the mainframe computer 10.

Also attached to the computer 10 is a S/370 LAN adapter 18 which is connected to a local area network (LAN) 20. While only one LAN is shown, it will be understood that a plurality of LANs can be attached to the mainframe computer 10. The LAN topology shown exemplifies IBM's Token Ring network, but other topologies including bus and star connections could be used. In the example shown, there are a plurality of intelligent workstations attached to the LAN 20, and the workstations share common data and executable programs. These include, for example, two DOS (Disk Operating System) workstations 22 and 24, four OS/2 (Operating System, Series 2) workstations 26, 28, 30, and 32, and two AIX (IBM's UNIX TM based operating system) workstations 34 and 36. Workstations 22 and 24 may be for example IBM PC/XT personal computers, workstations 26, 28, 30, and 32 may be for example IBM PS/2 Model 30 286 personal computers, and workstations 34 and 36 may each be an IBM RS 6000.

In order to properly communicate with the LAN 20 and the various workstations attached to it, the mainframe computer 10 has installed on it a LAN server platform 38 which is a multitasking work dispatcher. This platform supports a LAN communication application 40, a lock manager 42, a cache manager 44 and a common shared LAN file server 46. Because the intelligent workstations can be heterogeneous, i.e., running under several different operating systems, namely DOS, OS/2 and AIX, it is necessary for the LAN server platform 38 to include corresponding protocol converters 48, 50 and 52. That is, there are SMB protocol converters 50 and 52 for the DOS and OS/2 operating systems and there is an NFS TM (Network File System, a registered trademark of Sun Microsystems) protocol converter 48 for the AIX operating system. These converters convert workstation requests into a common request that is processed by the shared LAN file server application.

All the intelligent workstations on the LAN are permitted to update portions of the shared data concurrently by making concurrent requests to the server. Each intelligent workstation is unaware of the intents of the other intelligent workstations. A portion of the shared data is defined by a range of bytes or records. To maintain the integrity and consistency of the data, the shared application (i.e., the server) requires interlocking between concurrent transactions. The sequence of each transaction is as follows: (1) obtain a lock for the appropriate range, (2) read and update the respective data, (3) write the updated data to DASD, and (4) release the locks.

Figure 2:
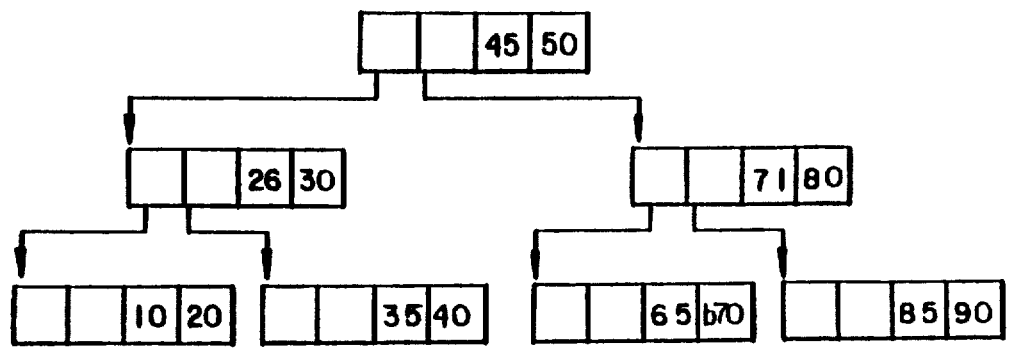
FIG. 2 is a diagram of a tree structure used in the according to the invention.

FIG. 2 shows a binary tree arrangement of lock requests, according to a preferred form of the invention, to keep track of the locked addressable element ranges. The data structure containing information defining locks and lock requests is preferably implemented in a tree structure to allow efficient searching thereof. However, the particular implementation of this data structure is, otherwise unimportant to the practice of the invention. Each node in the tree represents a particular addressable element range. The range corresponding to a node is indicated in FIGS. 2-5 by the number in the two right-hand blocks of each node. Each node also potentially points to a node to the left which is a non-overlapping area starting and ending with lower elements and a node on the right which is a non-overlapping range starting and ending with higher elements. These pointers are indicated by the left-hand blocks of each node which do not contain numbers (since the form of address designation by the pointers is essentially arbitrary). As illustrated, particularly in the left-hand branch of FIG. 2, these ranges need not be contiguous.

The present invention is principally directed to a lock management mechanism and not to a specific tree structure. In practice of the invention, it is considered preferable to use AVL trees since AVL trees are dynamically rebalanced to provide optimum search efficiency. However, any existing search algorithm or tree technology can be employed in the practice of the invention, and it is conventional to manage the tree structure in order to keep the tree balanced. Representative usable tree structures are B-trees, B+-trees and AVL trees. In the interest of completeness of this disclosure, points at which it is desirable to provide rebalancing of the tree structure, if necessary, will be indicated. For more information on tree structures, reference may be had to the text book by C. J. Date entitled *An Introduction to Database Systems*, Volume 1, third edition, published by Addison-Wesley Publishing Co. (1981), and particularly to Chapter 2 of that text book. Reference may also be made to Kruse, *Data Structures and Program Design*, 2nd Ed., Prentice-Hall (1984), and particularly to page 344 of that text book for information on AVL trees.

At each node of the tree, additional information will be needed. This information at least identifies the process that locked the range of the shared resource. If another process is waiting for exclusive use of the range, then it is also required that a pointer exist to a linked list of waiting processes. The information useful in implementing the invention will be more fully disclosed below with particular reference to FIG. 7. However, for a basic understanding of the invention, it is sufficient to note that the lock owner, if any, be identified and that a list is maintained in association with each node of all requesters of locks for that node.

According to the present invention, there are two elements that allow for compact data structures and fast searching, respectively. Problems of overlapping requests are resolved by dynamically decomposing requests into non-overlapping segments which are then granted atomically. Fast searching and easy detection of overlapping ranges are simultaneously accomplished by placing control information about locked areas into a binary tree structure. The data structure developed during such decomposition and by which overlapping requests are handled is particularly well-suited to such tree structures. Thus, while the invention is principally directed to the accommodation of overlapping lock requests, the combination of the lock decomposition technique of the invention with a tree structure provides a powerful and efficient arrangement for monitoring lock requests.

The implementation of the invention which will be described is directed to serially received, possibly (but not necessarily) differing lock range requests. It is to be understood that the invention is largely independent of the type of data structure (e.g. tree) manipulations, the possibility of multiple simultaneous data structure manipulations or the mechanism which might be employed to serialize simultaneous requests.

The invention recognizes that the known techniques for managing lock requests cannot be extended to obtain a lock manager of general applicability and which will perform in an optimum manner because:

1. Bit maps, per se, cannot contain sufficient information concerning owners and requesters of locks and consume large amounts of memory as well as requiring a separate system to perform actual management of the lock state or states and, even with a supplementary data structure to contain owner and requestor information, do not provide management of overlapping requests;

2. Linked lists also do not inherently provide management of overlapping requests and are inherently difficult and time-consuming to search, tending to become larger with the size of the shared resource and number of users and to become complex and even more difficult to search when the system is interactive or the requests are highly randomized or numerous;

3. Locking individual elements consumes large amounts of memory and represents significant computing overhead since each addressable element contained in a request or lock must be dealt with as a separate simultaneous request; and 4. Rounding up causes locking of ranges which have not actually been requested, causes false contention, and by the same token, the size of the predetermined ranges of the resource which can be individually locked cannot be optimized for a generalized application. Further, rounding up is inherently subject to a trade-off between hardware and computing overhead, on the one hand, and incidence of false contention, on the other.

The techniques of individual addressable element locking and rounding up both inherently multiply the number of locks and, since locks must be positively unlocked when access is terminated, unlocking errors can cause an additional form of false contention since failure to unlock a single addressed element upon termination of an access could cause denial of access to all subsequent requests which contain that addressed element.

As described above, provision of multiple states and differing kinds of access may be desirable and the preferred embodiment of the invention does accommodate such multiple states. As illustrated in FIG. 1, if different users using different operating systems such as Sun Microsystem's NFS ™ and Microsoft DOS ™ were simultaneously present, differences in bit stream format may prevent proper presentation of data accessed. For example, homogeneity among users would tend to indicate that a shared access is a preferable lock rule to apply while either heterogenous requests as well as necessarily exclusive access states (e.g. read/write access) would indicate that exclusive access should be requested and, if possible, granted. Therefore, an additional wait state might be required restricting access by some user groups of a locked range even when shared (e.g. read-only) access to the locked range is permitted within the lock to provide restrictions as to sharing, causing other requestors to wait. However, in the interest of clarity, the following description is directed first to the use of an exclusive lock state (i.e. read/write exclusive) and then extension of the basic invention to multiple states and complex waiting rules will be described.

A critical part of the invention has to do with requests for overlapping ranges. Overlapping ranges can take a plurality of forms and each of these forms will have an orientation based on the ranges requested and the order of the requests. The most distinguishable form of overlap can be visualized where two ranges which differ in starting and ending addresses. For instance, a first request for a range from element 128 to element 512 followed by a request for a range from element 0 to element 256 would be denominated as a left-side overlap since the subsequent request contains a request for elements which are of lower addresses than are included in the first request. Similarly, a first request for elements 0–256 followed by a request for elements 128–512 would be denominated as a right-side overlap since the subsequent request overlaps the first toward higher element addresses. For the purpose of distinguishing these forms of overlap from other forms of overlap, to be discussed below, such forms of overlap will be denominated as "strict overlap".

Another form of overlap is where requested ranges share an end point element address. A first request for elements 128-512 followed by a request for elements 0-512 would be an example of a leftside overlap with a shared end point on the right side.

Overlapping requests can also take the form of inclusions and containments. The distinction between inclusions and containments resides in the order and size of the requested ranges. For instance, a first request for elements 0-512 followed by a request for elements 0-256 would be denominated as a left-side inclusion since the second request is for a range "included" within the first request and shares a "left-side" end address. Total inclusions, for example, a first request for elements 0-256 and a subsequent request for elements 64-128, may also exist. Conversely, containments are exemplified by second requests which are for larger ranges than first requests and, hence, "contain" the first requested range. Similar to inclusions, containments may be of the left-side, right-side and total types.

The fundamental concept of the invention is the application of elements of graph theory to the problem of requests for overlapping ranges, as will be discussed in more detail below with reference to FIG. 7. Specifically, whenever overlapping requests are found, they are divided or decomposed into non-overlapping requests which can be handled individually. For example, if one request locked elements 10 to 20 and another wished to lock elements 15 to 25, then three ranges would be created by decomposition of both the lock and the request. The resulting ranges would be 10 to 14, 15 to 20 and 21 to 25. The original holder of the range 10 to 20 would then hold, or own, decomposed subranges corresponding to elements 10 to 14 and 15 to 20. The second requestor would be a waiting process for subranges corresponding to elements 15 to 20 and 21 to 25. The second holder would only be granted exclusive use if all parts could be granted atomically (e.g. simultaneously). This node decomposition when overlap occurs for this particular example is depicted in FIG. 3.

Figure 3:
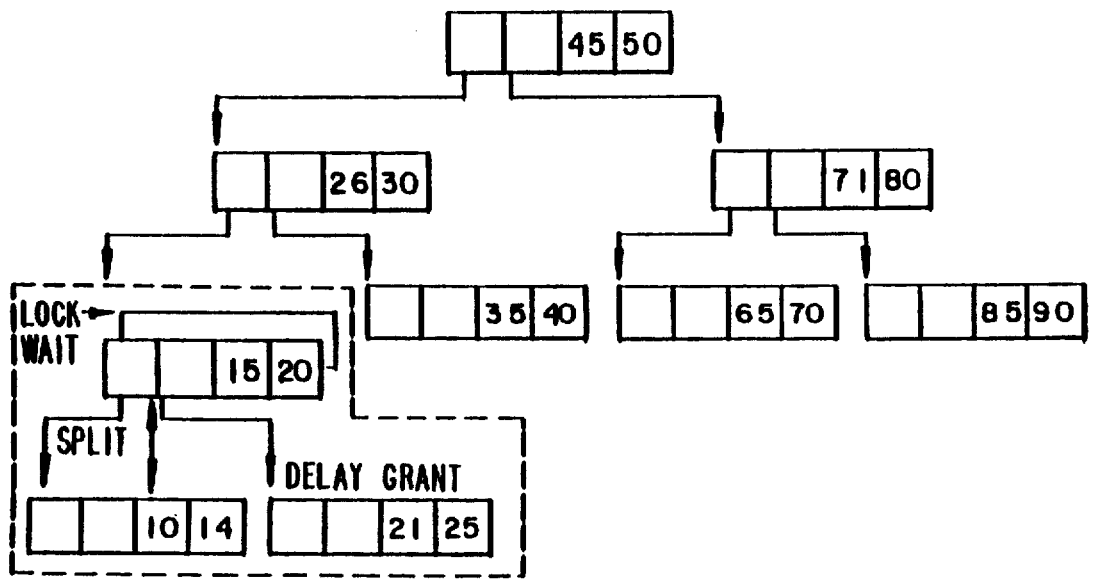
FIG. 3 is a diagram of the tree structure shown in FIG. 2 illustrating the splitting of overlapping requests.

Comparing FIG. 3 to FIG. 2, the left-most "leaf node" of FIG. 2, representing the lock of elements 10-20 is decomposed into two nodes: one representing a lock on elements 15-20 and containing pointers to two further leaf nodes and another leaf node on the left representing the lock for elements 10-14.

FIG. 3 also shows a decomposition of the new request into two nodes: one on the left corresponding to subrange 15-20 where the requestor is identified as a waiter on an existing, locked node and one on the right corresponding to elements 21-25. This node on the right is denominated as a "weak node" since it has the requestor as a waiter but has no owner since the invention prevents a lock from being granted until all part into which the request is decomposed are available simultaneously. This process enables a unitary description of each subrange to be maintained. This process also avoids the appearance of a range being locked when it is not actually locked (e.g. in use simultaneously with other owned locked ranges). Therefore, a range identified by a weak node would be available to another requestor which requested only the weak node range (or a portion thereof) or the weak node range together with one or more currently available ranges. This feature of the invention is particularly important since it allows maximum utilization of the shared resource.

Thus, from the above example, it is seen that both the lock and the request may be decomposed into non-overlapping ranges, each of which can have lock states indicating that it is owned, waited for (e.g. a "weak node") or both owned and waited for. The decomposition of the locks and requests is entirely transparent to both the requestors and owners of ranges since the subranges into which the locks and requests are decomposed are always linked, for instance, by pointers.

Figure 4:
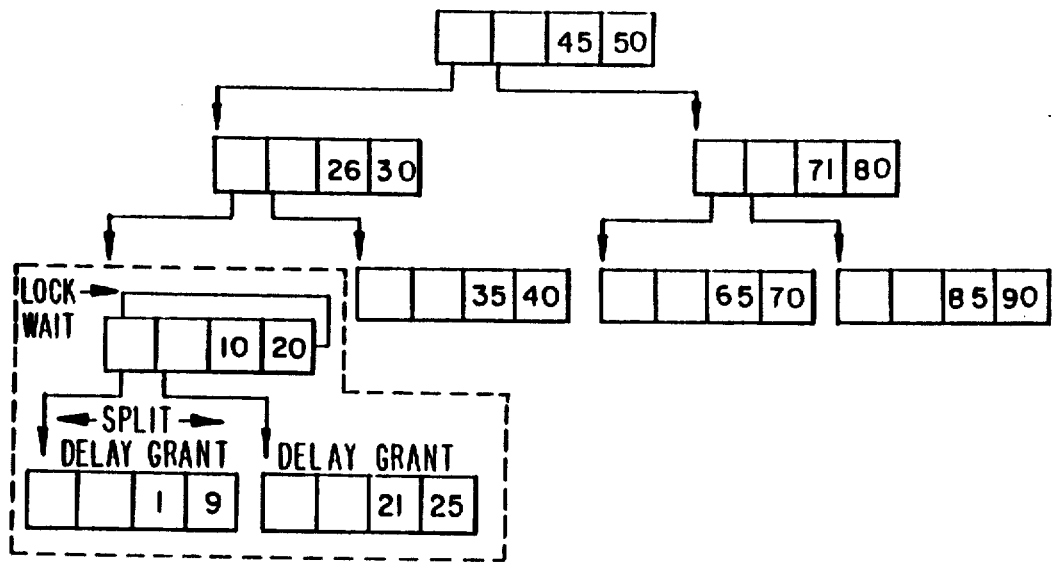
FIG. 4 is a diagram of the tree structure shown in FIG. 2 illustrating the node decomposition on containment.

FIG. 4 depicts node decomposition upon a total containment condition resulting from a request for range 1-25 when a lock for range 10-20 already exists. In this case, the request, rather than the lock is decomposed into three ranges, specifically 1-9, 10-20 and 21-25. Grant of a lock is delayed for the resulting leaf nodes (elements 1-9 and 21-25) and a wait condition is indicated along with the existing lock for elements 10-20.

Figure 5:
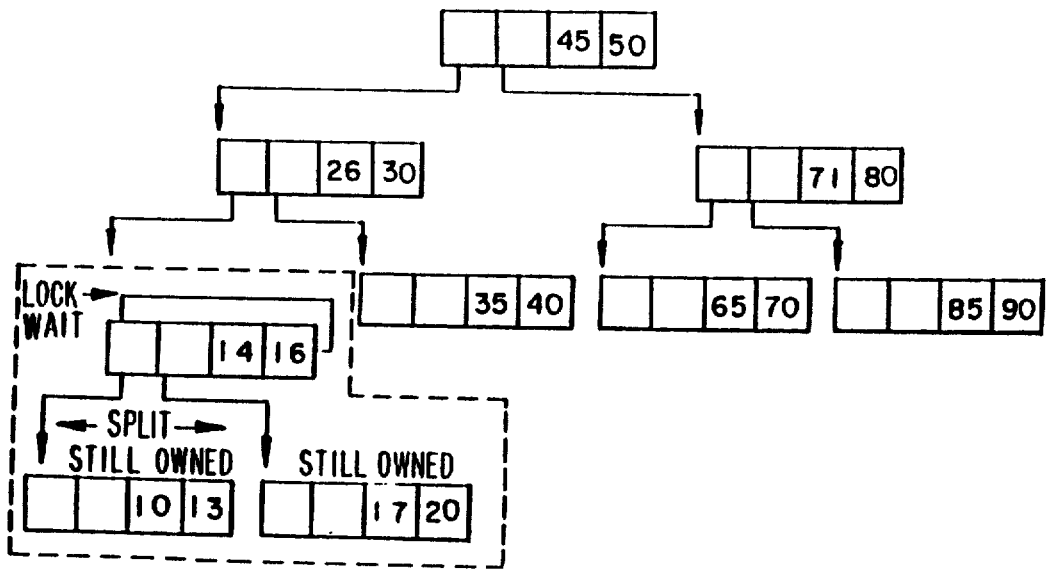
FIG. 5 is a diagram of the tree structure shown in FIG. 2 illustrating the node decomposition on inclusion.

FIG. 5 depicts node decomposition upon a total inclusion condition resulting from a request for range 14-16 when a prior lock on range 10-20 already exists. In this case, the lock is decomposed into three ranges 10-13, 14-16 and 17-20, all of which remain owned by virtue of the pre-existing lock but a wait condition is indicated only for the node corresponding to the subsequent request.

The particular process by which the nodes are decomposed, as depicted in FIGS. 3-5, will be more specifically discussed below with reference to FIGS. 6b, 6b₁ and 6e. The important feature of the invention to note from the foregoing discussion of FIGS. 2-5 is that all nodes will correspond only to ranges which are fully owned, fully requested or both. Therefore, locks will exist only for ranges of the common resource which are actually in use and weak nodes will exist only for waited ranges of addressable elements. Accordingly, the number of descriptors of ranges for which locks and weak locks exist will be minimized since no more nodes than necessary to decompose overlapping requests into non-overlapping ranges will ever be created. This minimization of descriptors is maintained through node recomposition, which will be discussed below, as locks are released. Therefore false contention cannot occur and the resources used to monitor locks is kept at a minimum, also minimizing the usage of computational resources of the system. Further, since locks and weak nodes will be respectively assigned only to the shared resource ranges which are fully in use or fully requested, respectively, the shared resource can be maximally utilized.

While it has been demonstrated above how overlapping requested ranges are decomposed into non-overlapping ranges, it is important to an understanding of the invention to recognize that the locks and requests themselves are decomposed and recombined by the lock management system of the invention. For this purpose, it is important to understand that a unitary, unique description for each locked and waited range will result from the operation of the invention. This unitary, unique description will be hereinafter referred to as a "singular description" of a locked or waited range to denote that it is both unitary, as a single description of a locked or waited range and unique in range, ownership, lock state and waiter list. The essential properties of each singular description are that it is a description of a range of addressable elements which have consecutive addresses or are otherwise contiguous in the shared resource (e.g. describable by a first element starting address or offset and an length) which is unique in range, ownership condition (e.g. no owner, where only waiters exist; one, where the lock state is exclusive, with or without one or more waiters; or a plurality of owners, again, with or without one or more waiters, as may be consistent with the lock state), lock state (e.g. exclusive, shared, etc.) and waiter list. The range described by a singular description may not overlap with any other range for which a singular description exists and this condition is maintained by decomposition of locks and overlapping requests into a plurality of singular descriptions. Conversely, if two adjacent ranges described by such singular descriptions are unique only in the ranges represented or are otherwise identical in ownership condition, lock state and waiter list, these singular descriptions are combined into only one singular description.

It is also important to distinguish between the singular descriptions of non-overlapping ranges of addressable elements, described above, from the descriptions of locked and requested ranges as they appear to an owner and requestor, respectively. The description of a request which may or may not result in the grant of a lock will consist of a request for one or more ranges of elements and the type of lock state desired (e.g. exclusive or non-exclusive). The questions of overlap and ownership are only relevant to the requestor to the extent that such conditions determine whether or not a lock or a wait is granted to the requestor. As pointed out above, the decomposition and recombination of requested and locked ranges is completely transparent to users of the invention since the singular descriptions are only seen and utilized by the lock manager. Therefore, while each request can result in the creation of many requested subranges to maintain a singular description for each subrange, the lock manager maintains a description of the entire request even when one or more of the requested ranges is decomposed into multiple subranges by horizontally each subrange with other subranges in the request. This allows singular descriptions of each subrange to be maintained and preserves the appearance, to the requestor, of the original request.

Binary tree structures are well-recognized in the art to be structures which facilitate rapid searching for data therein. This is so because each inquiry of the search in an ideally balanced tree will eliminate one-half of the nodes of every subtree interrogated from the remainder of the search. For that reason, an AVL binary tree structure, known in the art, per se, is included in the preferred implementation of the invention because of its dynamic rebalancing and the invention will be described with reference to this preferred implementation. However, it is to be understood that any other searchable structure binary tree structure such as "B-trees", "B++trees", or skip lists and the like are also suitable for the practice of the invention. The binary tree structure is implemented in memory of the mainframe computer 10 and is used by the lock manager 42 to quickly find the status of a relevant addressable element range within the overall range. If a range is currently locked, then information about the locked range is kept within the node of the tree. This information normally consists of an owner or owners and, in some cases, a list of waiting processes.

It should be noted that while a node is always capable of storing information identifying any waiters which may occur, it has been found in practice that the invention allows such efficient utilization of the shared resource that for any given range the likelihood of any waiter existing at any given time is, in fact, very small. Accordingly, the effect of the invention is that requests for locks are usually granted in a minimal amount of time, providing both enhanced user convenience and an increase in the number of possible users which may conveniently share the resource.

When lock requests are split in containment situations, it is important that the parts that are immediately available not be locked. Locking these areas could lead to unexpected deadlock. This means that some ranges of elements would only have a waiting process, but no holder or owner. As noted above, this condition is referred to as a weak lock or weak node. When individual lock requests are decomposed into parts due to overlapping lock requests, the information about each whole request should be retained. This is done by horizontally linking the singular descriptions of the decomposed parts. It may be useful in some applications, but it is not generally required, to keep lock requests chained together in accordance with each lock requestor. This would be done in order to quickly identify all of the locks in the event of the failure of a requestor in order to cancel locks and assist in recovery of data or avoiding data corruption.

The invention will now be further described by way of illustrative examples and with particular reference to the flow diagrams of FIGS. 6a–6e.

Figure 6A:
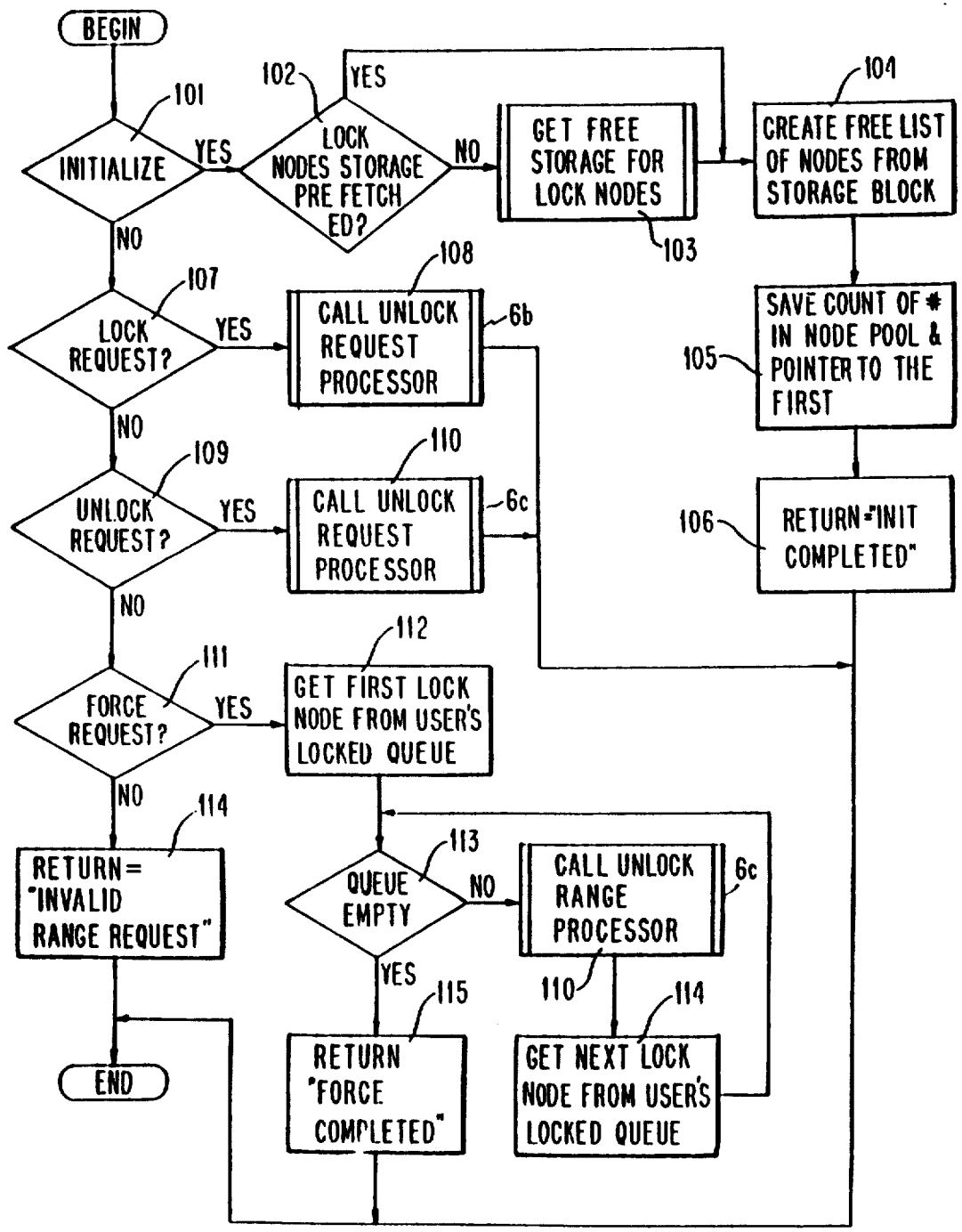
FIGS. 6a, 6b, 6b$_1$, 6c, 6c$_1$, 6c$_2$, 6d, 6d$_1$, 6d$_2$, 6e, 6f, 6f$_1$, and 6f$_2$ are flow diagrams illustrating the logical operation of the locking mechanism according to the invention.

FIG. 6a shows the basic operating process of the invention. In FIG. 6a and 6b–6e which follow, operating blocks which are constituted by subroutines will be illustrated by rectangular blocks with doubled lines at the left and right sides. When a process is invoked which requires a change of status of any lock, a determination is made at 101 as to whether initialization is necessary. If so, a check 102 is made for whether storage space has been designated to contain node information. If not, a subroutine 103 is run to allocate such space. If such space has been prefetched, the initialization procedure then creates, at 104, a free list of nodes in that space. A count of the nodes is stored 105 and a pointer to the first location corresponding to a node is established. The initialization procedure is then completed by generation of a signal to that effect.

If there is a requirement for change of lock status, after initialization, determination 101 will branch to "no" and a further determination is made at 107 as to whether the required change in lock status is a valid lock request. If so, the lock range processor subroutine 108, illustrated in detail in FIG. 6b and 6b$_1$, is invoked. If not, a determination is made at 109 if the required change of lock status is a valid unlock request and, if so, the unlock range processor 110, illustrated in detail in FIGS. 6c, 6c$_1$ and 6c$_2$ is carried out.

Although not particularly significant to the basic concept of the invention, it is also often useful to provide for force requests to provide the capability of interrupting an existing lock. According to the invention, this feature is implemented by performing another determination to detect such a valid force request at 111. If no branch was required at 107, 109 or 111 by a valid lock, unlock or force request, respectively, the routine is completed by returning an "invalid range request" signal. If, however, a valid force request was detected, the process looks to the user's locked queue to obtain the first lock node therein at 112. The user's queue is tested 113 for the existence of locked ranges and each node will be unlocked in turn by invoking the unlock range processor 110 (FIG. 6c) and obtaining the next node in the queue. When the queue is empty, a return signal is generated 115 indicating that the force was completed.

Figure 6B:
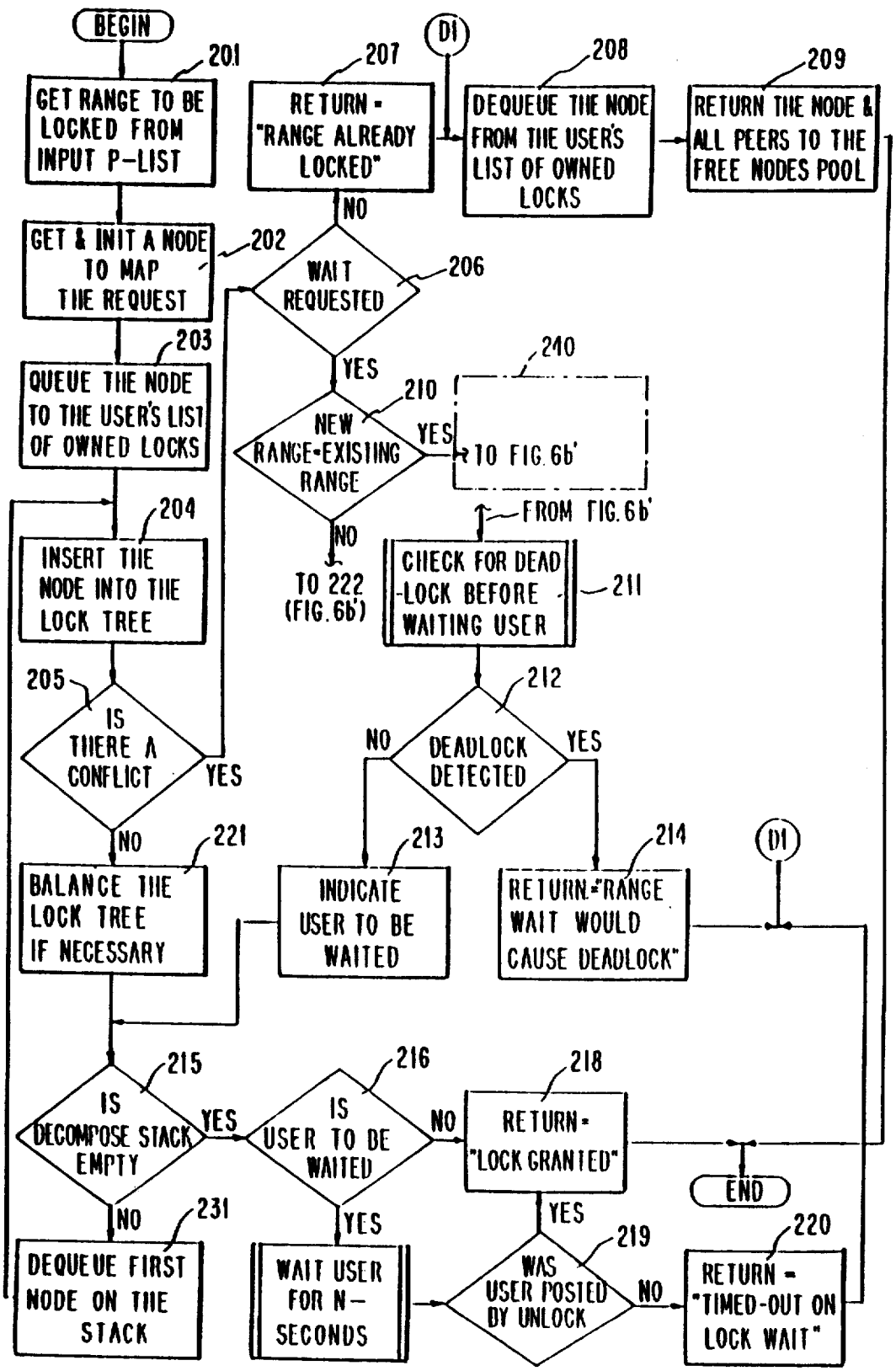

If a valid lock request is detected at 107, the lock range processor subroutine illustrated in FIG. 6b is invoked. First, the data defining the range to be locked is obtained 201 and a node is obtained and initialized 202 and placed 203 in the user's queue of owned locks. The node is also placed into the lock tree at 204. The tree is then searched to determine 205 if any conflict exists between nodes. It is important to understand with regard to conflict detection 205 that the decomposition process of FIG. 6e will also cause new nodes to be added to the tree. These new nodes are stacked in a queue during decomposition and then dequeued, added to the tree and tested for conflicts. Decomposition must be repeated in a looping fashion until all conflicts are removed. For purposes of understanding this aspect of the invention, the portion of FIGS. 6b and 6b$_1$ enclosed with a dotted line 240 can be considered as a single decomposition step with each process sub-step therein corresponding to FIG. 6e and each decision block 222-230 determining data to be used in step 501 thereof and controlling the left and right peer decomposition therein.

Any lock request will contain data about whether a wait condition is an acceptable response. If a conflict is determined at 205, a first test is done 206 to determine if the requestor can be waited of if an immediate denial of the lock is required. If a wait condition is not acceptable, a "range already locked" return is made 207, and the node is removed 208 and returned 209 to the free list.

If a wait state is allowed by the request, a determination is made 210 of whether the requested range is coextensive with an existing range defined by a node. If the requested range is coextensive with an existing range, decomposition will not be required and the process of grant or denial of a wait state for that range can be immediately initiated. If the requested range is not coextensive with an existing range, the requested range is subjected to an application of a graph theory concept which is a sequence of tests against a conflicting existing range to obtain parameters for control of decomposition which is then performed in accordance this FIG. 6e and the decomposed nodes stacked.

The process of granting a wait state then begins with a check for the possibility of a deadlock if such wait state is granted. This test is preferably conducted as a subroutine in accordance with FIGS. 6f$_1$ and 6f$_2$ which will be described below. If a potential deadlock is detected, a return so indicating is generated 214 and the process is completed by returning the node to the free node list at 208, 209 as indicated by D1. If no potential deadlock is detected, the wait is granted 213. If further decomposition is necessary, that condition is detected at 215, a node is dequeued from the decompose stack 231, inserted into the tree 204, conflicts evaluated 205 and the process repeated until all conflicts are resolved. When no conflicts remain, the binary node tree is rebalanced 221, if necessary, to maintain efficient searching capability and a final check of the decompose stack is made 215. If no further decomposition is required, the grant of a wait state causes branching to either a "lock granted" return or a wait subroutine for a predetermined time interval, which can take any known form. If, during this interval, an unlock 219 of the range occurs, a lock is posted and a "lock granted" return 218 is made but if not, a "timed out on lock wait" return 220 is made.

The node/range decomposition of FIG. 6e begins with the establishment of conditions based on the tests 222-230 and the input of a decomposition point at 501. A subroutine is then invoked to obtain a further node from the free list 502 and data is copied 503 from the node to be composed into the new node. The order of steps 504 and 505 is arbitrary to branch to one of processes 506 or 507. These processes involve only storage and simple computations for establishing starting and ending points for the ranges resulting from the decomposition. Linking data for the peers is also stored with the resulting ranges according to the exemplary data structure of FIG. 9$_1$ and 9$_2$.

If an unlock request is detected at 109 of FIG. 6a, the range unlock subroutine, illustrated in FIGS. 6c$_1$ and 6c$_2$ is invoked. Since this subroutine can be invoked by a branch at either 109 or 111, these two conditions must be discriminated at 301. Since, in this case, the branch was due to an unlock operation, the range of the unlock operation will be obtained at 302. The user's queue of owned locks is then searched 303 for a node having a corresponding range. If such a node is not found 304, a "range not locked by user" return 306 is generated and the procedure ends. If the node is found at 304, it is dequeued from the user's queue at 305. Then it is assumed that the node is decomposed and the leftmost peer is located 307 from which the unlock operation will proceed. Peer nodes to the right of the left-most peer are pushed in a stack and will be unlocked in turn.

Next, it is determined 309 if the left-most node is an owner or a weak node (e.g. having waiters only). If it is an owner, it is then determined 330 if there are other granted waits for the range of the node. If it represents only waiters, the range is free to be locked by a subsequent request and is returned to the node pool at 313. If there are waiters for the range, the first is checked for time out at 332. If it is not timed cut, it is checked to see if it is already stacked for time out processing at 336 and, if necessary, flagging and stacking is carried out at 337, removed from the wait queue at 338 and the wait queue is again evaluated until a waiter which is not timed out is found or the queue is empty. If a waiter which is not timed out is found, it is made the owner of the range at 333. The number of waits associated with the new owner of the range is then decremented and evaluated and if the new owner is waiting for no other ranges the range is placed for posting on the recomposition queue. If the new owner is waiting on another range which is locked, no lock can be granted and the node is returned to the free node pool at 313.

If the node evaluated at 309 is a weak node, meaning that only waiters exist, the first waiter is checked for time-out and, if so, it is dequeued from its master (e.g. the node controlling the lock corresponding to the weak node at that point in time) 312, if found necessary at 311. In either case, the node is returned to the free node pool at 313 and the next peer to the right is obtained from the unlock stack and, unless the unlock stack is empty, the process loops until all peers are unlocked in a manner which is appropriate in view of the list of processes which may be waiting for each peer range.

When the unlock stack is empty, the time out stack is evaluated and if not empty, the process loops to 307 to cause recomposition of any decomposition which is no longer required because of the time out. Then the recomposition stack is evaluated for contents 319 and if not empty 320, any node found will be dequeued 321 and recomposition carried out 322 in accordance with the flow chart illustrated in FIGS. $6d_1$ and $6d_2$. This process loops until recomposition is completed and the recomposition stack is empty.

The process operates in precisely the same way if a force request causes a branch at 111 of FIG. 6a and is discriminated at 301 except that the branch at 301 avoids the search of the user's list. Such a search is, of course, unnecessary when the operation is forced.

It should be noted that the preferred embodiment of the invention actually provides three type of release operations. The above form of release operation releases one or more nodes which are both associated with a single owner and a single request. It is also useful to provide for release of all locks which are associated with all requests from a particular owner in order to, for instance, avoid data corruption when a malfunction is detected associated with that owner. It is also useful to provide for a release of all locks of all concurrent owners of a lock corresponding to a request in order to, for instance, change a lock state from shared to exclusive which is essentially a variation of a forced request. These additional types of releases are most readily accomplished by merely reiterating the above procedure until the desired releases are achieved.

The recomposition process 322 of FIG. $6c_2$ is illustrated in detail in FIGS. $6d_1$ and $6d_2$. When this operation is begun, it is well to note that all sorting of nodes for waiting requests will have already been accomplished and adjacent ranges which are newly commonly owned, requested by an exactly common list of waiters or are free are known. For each node (which will be the left-most in a group of peers) to be recombined, a corresponding central node is found at 401. If the left-most node and the central node are the same, there can only be a right peer and if none is found at 402, the recomposition is trivial. Nothing is left to recompose 403 and a subroutine is called to post a user-owner 404 and an "unlocking done" return 405 is made. If the central node has a peer, it is first checked for identity with a left peer, that is, does a left peer exist with respect to the central node? If there is no left peer, the central node is then checked for a right peer 407 and, if none, the recomposition again becomes trivial and the process is ended in the sequence noted above.

If the central node has a left peer, the central node is evaluated for waiters and separate evaluations 409, 413 of the left peer are provided for either eventuality. If there is no waiter on either the central node or the node to its left, those two nodes are recomposed 410, the former left node is then removed from the tree which is rebalanced, if necessary, at 411 and the left peer node is returned, if desired, to the available node pool 412. If there is a waiter on the central node and there is a waiter on the peer to the left of the central node 413, a check is made for other left peers and any waiters on that further left peer will be evaluated. This process will loop until waiters are not found for a node further to the left of the central node. When such a node with no waiters is found, a check for yet another left peer is conducted 415 and, if others are found, waiters are evaluated and, if found 416, the loop is reentered at 414.

Basically, this process, looping in this fashion, looks to the left and right to find adjacent peer nodes with no waiters or identical lists of waiters since nodes can only be recomposed if these conditions of adjacency and identical or null waiter lists are met.

If there are no waiters on the current left peer, recomposition is carried out at 417, 418 and 419 in a manner similar to 410–412 and the process is looped to check for other left peers at 415. When this process is exhausted by a failure to find a further left peer at 414 or 415, the process returns to the central node 420 and checks for a right peer at 407. If such a right peer is found, waiters, further right peers and waiters for such further right peers are evaluated and recomposed in sequence as done with left peers. The remainder of the flow chart is accordingly believed to be self-explanatory and discussion thereof is unnecessary.

Returning now to FIGS. 6b and $6b_1$, when subroutine 211 is reached through decomposition of a node, a deadlock avoidance algorithm., preferably in the form illustrated in FIGS. $6f_1$ and $6f_2$ is begun. When invoked, the algorithm initializes itself by setting the deadlock stack to null 601, setting user A as the user to be waited 602 and any existing lock of user A as the first lock owned by user A 603. Then, if the lock of A in null 604 and the deadlock stack is null 609, detection is trivial, a "no deadlock" return is made 610 and the routine is completed. If the lock of A queue is non-null, the first waiter on the range locked by A is identified as user B. If there is a user B, the lock of A pointer is set to the next lock pointed to by the lock of A and the process loops to 604. If there is no user B, the lock of B is defined as the first lock owned by user B at 608 before a check 614 that the lock of B is non-null. If the lock of B is non-null, a first waiter X for the node which is the first lock of B is identified 615 for purposes of the deadlock search. If no such waiter exists 617 (e.g. waiter X =null), then the next waiter for the node is identified 616 as waiter B and the process loops back to 606. If there is another waiter detected 617 which is also detected to be the same as the user (e.g. owner) A 618, a "deadlock detected" return is generated 619 and a wait is not granted. If not, a check of the deadlock stack is made 620 to determine if waiter X is already on the deadlock stack. If not, waiter X is pushed on the deadlock stack 621 after which, waiter X is defined as the next waiter waiting on the lock of B 622 and the process loops to 617. In this way, each waiter in each node wait list is compared to a wait which is to be granted to determine if a deadlock will be created by the granting of such a wait. If a potential deadlock would be created by the granting of such a wait, the granting of the wait is prevented and the "deadlock detected" return informs the requestor that a wait will not be granted.

Essentially, the potential for a deadlock exists if any requested lock has a waiter which also owns the lock on which a wait state is sought to be granted (e.g. waiter X =user A). The above process performs a two-level test and individually checks the locks owned by the requester in sequence for waiters which are then individually checked for owned locks to ascertain that the waiter does not own locks on which a wait state is to be granted.

It can been seen from the above discussion of FIGS. $6a-6f_2$ that numerous pieces of data are required to define each node and to establish a tree structure which can be easily searched. An exemplary set of these data will be discussed in connection with FIG. 10. However, for purposes of understanding the invention and its particular advantages over the prior art, it is sufficient to think of each node as containing two lists, one identifying the owner of a node and the other containing identification of all waiters for the range corresponding to the node.

With reference now to FIG. 7, the operation of the invention will be graphically depicted. Assume at time $T_1$, two locks (say, #7 and #10) exist. This causes at least one unitary description to exist for each of the two nodes N1, N2 on ranges 1–25 and 26–50, respectively, as depicted at division $D_1$, which illustrates the state of the tree at that time. Each node has two lists, L and R associated therewith. In node N1, the L list contains the identifier of the owner of the lock (7) and the same is true for the L list of N2 which contains the identifier 10. The R lists of each node are empty since it is assumed that there are no waiting requests at this time.

Now, assume at time $T_2$, requests #1 and #3 are received. Either request #1 or #3, whichever is processed first, will cause creation of node N13; #1 because it is an inclusion within lock #7 and #3 because it is a strict overlap with lock #7. Request #1 also causes creation of nodes N11 and N12 as depicted in division $D_2$. Note that request #1 is listed as a waiter in the requestor list of N12 only while lock #7 is on the lock lists of N11, N12 and N13, which now constitute a divided description of the lock previously described in a unitary form at node $N_1$.

Similarly, node N15 will be created since request #3 is a containment of lock #10. Assume at later times $T_3$ and $T_4$, respectively, additional requests #42 and #61 and then #79, are made. The division of the resource and the lists for each node will now be as depicted at $D_2$.

Assuming further that at time $T_5$, an unlock request is made to unlock range 26–50 which was locked by lock #10. Since the list of waiters for nodes N14 and N15 are identical, they are recomposed into node N25 as shown at D3 Nodes N11–N13 remain unchanged since lock #7 remains. Note also that request #3 cannot be granted on any node since N13 remains locked by #7. However, all requested ranges of request #42 (nodes N14 and N15) can be granted atomically and a lock is granted on these nodes. It is immaterial whether these nodes are recomposed before or after granting of the lock at 42 or even if recomposition is possible if there had been other requests maintaining the division. In any event, in this example, the waiter lists for nodes N14 and N15 would be identical either before or after the grant of a lock to #42 and therefore, these nodes are recomposed into node N25.

Now assume that unlock requests are received for #7 and #42 at time $T_6$. As shown at $D_4$, N11 is returned to the free node pool and is removed from the tree or other data structure. Node N31 is granted to the first waiter, #1 and now locks on nodes N35 and N36, corresponding to nodes N13 and N25, respectively, can be granted to requester #3 simultaneously and atomically. Note that these nodes are not recombined since the remaining waiter lists are not identical. However, these nodes would be recombined if a time out of request #61 occurred before unlocking of lock #3.

When lock #3 is unlocked, a lock would then be granted to #61 under the present embodiment of the invention. However, it is to be understood that this choice is arbitrary and other algorithms could easily be implemented in combination with the arrangement described above to give priority to the largest number of requestors unless time-out is imminent for a requestor of a larger range or other priority-establishing criteria which may be determined to maximize throughput of the system. An algorithm implementing such criteria may be advantageous to insure maximal usage of the shared resource but, to date, has not been found necessary.

Figure 8:
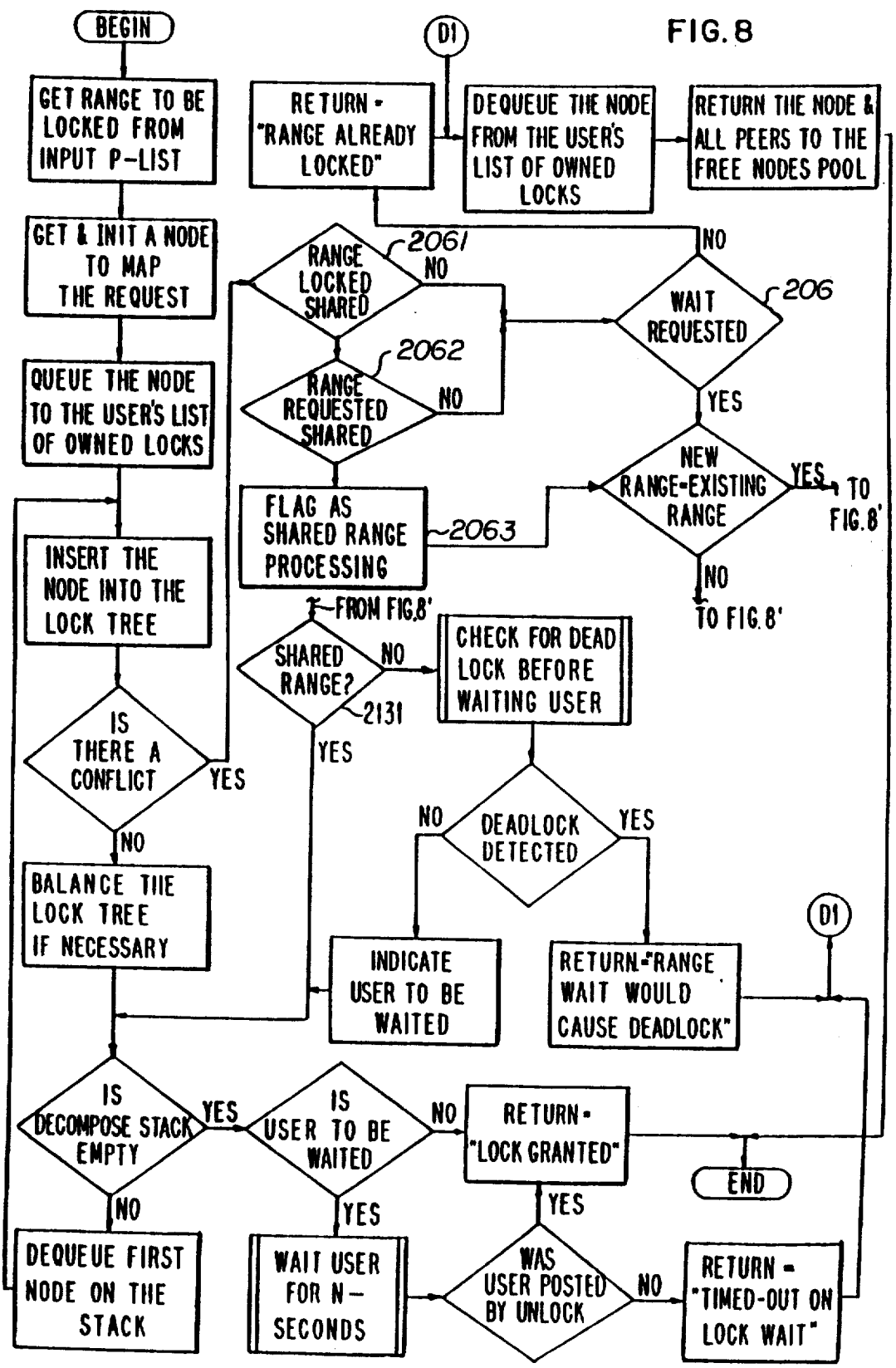
FIGS. 8 and 8$_1$ are a block diagram showing alteration of the lock processor of FIG. 6b to accommodate multiple lock states.

With reference now to FIGS. 8 and $8_1$, the preferred embodiment of the invention will now be described. It was noted above that plural states or sets of rules may be applied to ranges of addressable elements which are to be locked upon particular types of request for access. This is the case for the preferred embodiment in which the shared resource is a memory, the addressable elements are bytes and the accesses may be of at least the read/write type and the read only type. As also pointed out above, alteration of a file by more than one user at a time must be prevented and therefore read/write accesses must be exclusive. Conversely, many users should be able to read a file without altering it and such accesses may therefore be shared. A shared lock can therefore be granted to a plurality of requestors. In this regard, it was noted above, with reference to FIG. 7, that each lock will have a list of owners and a list of waiters and that the list of owners was limited to one for the exclusive lock state. For a shared lock, plural owners can be permitted in the list.

It should be noted that the operation of FIG. 7 remains unchanged in regard to the embodiment of the invention of FIGS. 8, $8_1$, 9 $9_1$, and $9_2$ except that there will be additional information regarding the lock state which must also be compared before recombination and the fact that, depending on the lock state, plural owners may exist in the owner list.

Upon comparison of FIGS. 8 and $8_1$ with FIGS. 6b, and $6b_1$ previously discussed, it will be seen that only three additional steps are required to extend the single state arrangement to two states. Otherwise, FIGS. 8 and $8_1$ is identical to FIGS. 6b and $6b_1$. Specifically, "wait requested" block 206 is preceded by two decision blocks 2061 and 2062 and flag setting step 2063 in FIG. 8 and decision block 2131 is provided to provide bypassing of deadlock checking if the requested range is a shared range. Therefore, once a conflict has been detected, the lock is checked to determine if it is a shared lock at 2061. Then the request is checked to determine that it is a non-exclusive request (e.g. that it is not a request for an exclusive lock). If, and only if, both of these conditions are met, can a shared lock be granted and a flag set indicative of the granting of the shared lock. Only a single state or type of lock is permitted for a range and all locks must be of the same type.

After decomposition, if necessary, (210 and 240 of FIG. 6b) the resulting ranges are checked to determine if the new lock, if granted, is a shared lock. If it is a shared lock and it can be otherwise granted (e.g. the requested shared state is the same as the granted shared lock), a deadlock could not be caused and the process is branched to allow the lock to be immediately granted and the data regarding the lock placed in the tree structure as shown in FIGS. 6b and $6b_1$.

It should be noted that for each additional state desired in a multi-state arrangement, it is only necessary to include a pair of decision blocks to test the lock and the request for the same state (and to set a flag if they are, in fact, the same state) and to discriminate whether or not the type of additional state can create a deadlock, regardless of how many lock states are provided in the system.

With reference now to FIGS. 9₁ and 9₂ it is seen upon comparison to FIGS. 6c₁ and 6c₂ that only a check 3301 for co-owners and a step 3302 to transfer ownership of the lock to such a co-owner need be added to the unlocking process to accommodate multiple states. If all states were exclusive states, these two additional steps would not be necessary.

As noted above, other information than the owner (lock) and waiter lists are necessary to the operation of the invention. A diagram of an exemplary data structure is shown is FIG. 10. Definitions for the illustrated terms are as follows:

LOCK_ELEMENT PTR - A pointer to the object (e.g. lock owner) with which the range of the node is associated;

NEXT₁₃ LOCKED_RANGE - A chain pointer to the list of ranges requested by a particular user (includes weak locks);

NEXT_TIMED_OUT_NODE - Stack pointer when a node is placed on the timed out queue;

NEXT_NODE_TO_RECOMPOS - Stack pointer when a node is placed on the recompose queue;

WAIT_QUEUE_ANCHOR - pointer to first waiter queued on a given range;

NEXT_WAITER_ON_QUEUE - Chaining information for the wait queue;

WAIT_PEERS_COUNT - number of pieces which must be waited when a node is decomposed before all pieces can be granted individually and atomically;

MASTER_NODE_POINTER - pointer to the node that currently owns a lock range;

CENTRAL_NODE_POINTER - pointer to the node that contains the global information for all pieces when a node is decomposed into multiple sub-ranges;

OFFSET—the starting point of the range;

RANGE_LENGTH - the size of the range from the starting point;

PARENT_NODE - the node in the tree preceding a given node;

LEFT_PEER - subrange less than a given range when a node is decomposed;

RIGHT_PEER - subrange greater than a given range when a node is decomposed;

LEFT_CHILD - the node that represents an existing range which is completely less than the starting point of the node in question;

RIGHT_CHILD - the node that represents an existing range which is completely greater than the ending point of the node in question;

SUBRANGE_START - the start of the range of the node itself (same as offset if original node);

SUBRANGE_END - the end of the range of the node itself (e.g. offset+length−1).

Flags are used to indicate the identity of the lock state as well as for the other purposes described above. If only two states are provided in the system, only a single flag bit need be provided to distinguish those two states. Also, for the multi-state embodiment, owner queue information and a pointer to the next owner on the queue are included among the data illustrated in FIG. 10 to facilitate the decision and ownership change 3301, 3302, illustrated in FIGS. 9₁ and 9₂.

It is to be understood that the data structure and the particular data items are merely exemplary and other combinations of data could be used. The particular data for each descriptor corresponding to a node will also preferably be in the form of a pointer to a list. It has been found preferable to configure these lists as a first-in, first-out register and the term stacks, in which it is to be understood that order is not important, as well as queues, as used herein, are preferably so formed but this detail is not critical to the operation of the invention but merely a convenient expedient.

From the foregoing it is seen that a lock management system has been provided for a shared resource which is hardware efficient in the avoidance of replication of lock data or requiring large dedicated portions of memory to hold such information, rapidly functioning since it can be implemented in an easily searchable tree data structure and efficient in utilization of the shared resource since it requires no more of the shared resource to be locked than the ranges of addressable elements actually requested. In this latter regard, it should be recognized that the invention could be arranged to lock a number of addressable elements greater than the range requested without departing from the spirit and scope of the invention, although such a modification would not provide any particular advantage and would detract from optimum utilization of the shared resource. Nevertheless, such a provision could be useful in some circumstances. In any event, it is the feature of dividing singular descriptions of locks into other non-overlapping singular descriptions of locks and the recombination of singular descriptions into unique singular descriptions which provides the potential for optimal utilization of the shared resource.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. Apparatus including a lock manager means for representing possibly overlapping lock ranges of addressed elements, said apparatus including
   means for creating and maintaining at least one singular description of at least one range of addressable elements representing one or more addressable elements, and
   means responsive to at least requests for locks for controlling said means for creating and maintaining at least one singular description to at least divide overlapping descriptions of ranges of said addressable elements into non-overlapping, singular descriptions of ranges of said addressable elements.

2. Apparatus as recited in claim 1, wherein said means for controlling said means for creating and maintaining at least one singular description is responsive to releases of locks to selectively combine singular descriptions of said ranges of said addressable elements to form at least one other singular description of at least one range of addressable elements.

3. Apparatus as recited in claim 1, wherein each said singular description is at least one of fully held by a lock owner or fully requested by a lock requestor which has been granted a wait state by said lock manager and each said range described by one of said singular descriptions of a range of addressable elements is coextensive with at least a portion of a range which has been requested.

4. Apparatus as recited in claim 1, further including means for preventing grant of a wait state to a requestor which previously been granted a wait state by said lock manager for a range which is locked by a process waiting on a range which is, in turn, held by said requestor.

5. Apparatus including
   a lock manager means for maintaining a representation of at least one lock state range of addressable elements,
   means for maintaining said representation of said at least one lock state range as at least one singular description of at least one range of said addressable elements,
   wherein said means for maintaining said representation as at least one singular description includes
   means responsive to a lock request for dividing at least one said singular description into at least two singular descriptions of non-overlapping ranges of said addressable elements.

6. Apparatus as recited in claim 5, wherein said means for maintaining said representation as at least one singular description includes means responsive to a lock release for selectively combining at least two singular descriptions of nonoverlapping, adjacent, ranges of said addressable elements into a singular description of a range of said addressable elements.

7. Apparatus as recited in claim 5, wherein each said singular description is at least one of fully held by a lock owner or fully requested by a lock requestor which has been granted a wait state by said lock manager and each said range described by one of said singular descriptions of a range of addressable elements is coextensive with at least a portion of a range which has been requested.

8. Apparatus as recited in claim 5, further including means for preventing grant of a wait state to a requestor which previously been granted a wait state by said lock manager for a range which is locked by a process waiting on a range which is, in turn, held by said requestor.

9. A method of managing lock states of overlapping ranges of addressable elements including the steps of
   creating and maintaining at least one singular description of a range of said addressable elements, said addressable elements corresponding to each aid singular description having a continuous sequence of addresses,
   representing all of said lock states by one of said singular descriptions, and
   dividing at least one said singular description into at least two singular descriptions of non-overlapping ranges of said addressable elements.

10. A method of managing lock requests for locks on addressable elements of a shared resource including the steps of
    granting a lock on a requested range of a shared resource, said lock having a range coextensive with a request for said lock by a user of said shared resource,
    creating and storing a singular description of at least a portion of said range of said lock,
    creating a description of said lock and a further request for a lock on a range of said shared resource by another user of said shared resource, including at least one of
    a) creating and storing a divided description of said lock; one portion of said divided description of said lock being a singular description of a range of said addressable elements coextensive with a portion of said further request on which a wait is granted,
    b) creating and storing a divided description of said further request; one portion of said divided description of said further request being a singular description of a range of said addressable elements coextensive with a portion of said lock on which a wait is granted, and
    c) creating and storing, within said singular description of said lock, a wait on a range coextensive with said further request.

11. A method of managing lock requests as recited in claim 10 including .the further step of
    creating a singular description of a range within at least one of said lock and said request from two adjacent ranges of at least one of said divided description of said lock and said divided description of said request when said adjacent ranges of said divided description both have identical or null lists of requestors which have been granted a wait for said adjacent ranges.

12. A method of managing lock requests as recited in claim 10, including the further steps of
    searching said divided descriptions for a granted wait on a range which is also locked by a user of said shared resource, and
    preventing said grant of a wait state when a granted wait on a range which is also locked by a user of said shared resource is found during said searching step.

13. A lock manager including
    a data structure containing data identifying locks granted and requested for ranges of addressable elements within a shared resource wherein, when both locks and requests for locks are present, the data structure comprises only singular descriptions defining ranges of consecutive addresses of addressable elements which are at least one of fully held and fully requested, and
    means responsive to a lock request for dividing at least one said singular description into at least two singular descriptions of non-overlapping ranges of said addressable elements.

14. A lock manager as recited in claim 13, wherein said data structure is a tree structure and each of said singular descriptions are nodes of said tree structure.

15. A lock manager as recited in claim 14, wherein each node of said tree structure has a master node and wherein each said master node contains queue information identifying, in order, all holders of locks on said nodes of at least one said master node.

16. A lock manager as recited in claim 14, wherein each node of said tree structure has a master node and wherein each said master node contains queue information identifying, in order, all requestors for locks on said nodes of at least one said master node.

17. A lock manager as recited in claim 14, wherein each node of said tree structure has a central node and wherein each said central node contains requestor identifying information necessary to maintain said definitions of ranges of consecutive addresses of addressable elements as singular descriptions thereof when a request has been decomposed.

18. A lock manager as recited in claim 13, further including
    means for dynamically changing the size of said ranges represented by said singular descriptions thereof in response to at least one of a request for a lock which overlaps at least one of a said granted lock and a release of a lock on a range adjacent at least one other range described by one of said singular descriptions.

19. A method for locking ranges of addressable elements in shared resources of a multi-tasking or multi-processor data processing system to properly handle overlapping requests to lock ranges of data and files in the data processing system, including the steps of
dynamically decomposing requests into non-overlapping segments having singular descriptions of addressable element ranges and then
granting the decomposed requests atomically.

20. An apparatus for locking ranges of addressable elements in shared resources of a multi-tasking or multi-processor data processing system to properly handle overlapping requests to lock ranges of data and files in the data processing system, said apparatus including
means for dynamically decomposing requests into non-overlapping segments having singular descriptions of addressable element ranges, and
means for then granting the decomposed requests atomically.

21. A means for managing a multiplicity of addressable elements, each of said addressable elements having at least two different possible ownership conditions, one of said ownership conditions being an owned condition identifying at least one owner corresponding to said owned condition, wherein a multiplicity of users may share the use of said multiplicity of addressable elements, each said user being able to make a request to obtain said owned condition for one or more ranges of said addressable elements, said means for managing a multiplicity of addressable elements comprising,
means for dynamically partitioning said multiplicity of addressable elements into non-overlapping subranges of said addressable elements,
means for creating and maintaining a list of owners of each said subrange of addressable elements, each owner in said owner list having said owned condition with respect to each said addressable element in said subrange,
means for creating and maintaining a list of waiters associated with each said subrange of addressable elements, each waiter in said waiter list waiting for release of an owned condition with respect to each said addressable element in at least one subrange,
means for linking each owner in any said owner list with the same owner in other owner lists, said linking forming a linked list corresponding to one said request for said owned condition granted to said same owner,
means for linking each waiter in any said waiter list with the same waiter in other waiter lists, said linking forming a linked list corresponding to one said request for said owned condition granted to said same waiter,
means responsive to a further request by a requestor for an owned condition of at least one range of addressable elements, including addressable elements which are included within at least one said subrange of addressable elements, for further dynamically partitioning at least one said subrange of said multiplicity of addressable elements to separate said addressable elements in said further request included within said at least one subrange of addressable elements from addressable elements in said at least one subrange of said addressable elements which are not included in said further request, if any, said means for further dynamically partitioning said subrange of addressable elements including means for adding said requestor to one of said owner lists and said waiter lists of at least one subrange resulting from at least one of said dynamic partitioning and said further dynamic partitioning of said addressable elements.

22. A means for managing a multiplicity of addressable elements as recited in claim 21, further including a means for detecting overlap between said further request and at least one of said subranges, and wherein said means for further dynamically partitioning is responsive to said means for detecting an overlap.

23. A means for managing a multiplicity of addressable elements as recited in claim 22, wherein said means for detecting an overlap comprises means for comparing an offset and length of said at least one subrange and an offset and length of said further request.

24. A means for managing a multiplicity of addressable elements as recited in claim 21, further including
means responsive to a request for release of said ownership condition with respect to a designated requestor for deleting said requestor from selected owner lists containing said requestor,
means responsive to said deleting of said requestor for comparing owner and waiter lists of adjacent subranges of addressable elements, and
means responsive to said means for comparing owner and waiter lists for dynamically recombining adjacent subranges respectively having identical owner and waiter lists.

25. A means for managing a multiplicity of addressable elements as recited in claim 24 wherein said means deleting said requestor from selected owner lists containing said requestor, includes means for deleting said requestor from all said owner lists.

26. A means for managing a multiplicity of addressable elements as recited in claim 24, wherein said means deleting said requestor from selected owner lists containing said requestor, includes means for deleting all owners from said owner list of said selected subrange.

* * * * *